(12) United States Patent
Wang et al.

(10) Patent No.: US 8,196,030 B1
(45) Date of Patent: Jun. 5, 2012

(54) SYSTEM AND METHOD FOR COMPARING AND REVIEWING DOCUMENTS

(75) Inventors: Lever Wang, Cupertino, CA (US);
Glenn Ricart, Salt Lake City, UT (US);
Cynthia Ann Thompson, Menlo Park, CA (US); Keith Wishon, Los Angeles, CA (US); Sheldon Laube, Los Altos, CA (US)

(73) Assignee: PricewaterhouseCoopers LLP, New York, NY (US)

( * ) Notice: Subject to any disclaimer, the term of this patent is extended or adjusted under 35 U.S.C. 154(b) by 784 days.

(21) Appl. No.: 12/271,159

(22) Filed: Nov. 14, 2008

Related U.S. Application Data

(63) Continuation of application No. 12/240,793, filed on Sep. 29, 2008, now abandoned.

(60) Provisional application No. 61/057,955, filed on Jun. 2, 2008, provisional application No. 61/092,202, filed on Aug. 27, 2008.

(51) Int. Cl.
*G09G 5/00* (2006.01)
*G06K 9/00* (2006.01)
*G06K 9/34* (2006.01)
*G06K 9/36* (2006.01)
*G06F 17/00* (2006.01)
*G06F 17/20* (2006.01)

(52) U.S. Cl. ........ 715/200; 345/581; 345/619; 382/170; 382/177; 382/181; 382/276; 715/251; 715/254; 715/273; 715/277

(58) Field of Classification Search .................. 715/200, 715/243, 251, 254, 273, 700, 276–277, 713; 345/581, 617, 619, 635; 382/165, 170, 173, 382/177, 180–181, 276, 282, 290
See application file for complete search history.

(56) References Cited

U.S. PATENT DOCUMENTS

| | | | |
|---|---|---|---|
| 7,106,905 B2 | 9/2006 | Simske | |
| 7,200,802 B2 | 4/2007 | Kawatani | |
| 7,254,587 B2 | 8/2007 | Lee et al. | |
| 7,313,754 B2 | 12/2007 | McLure et al. | |
| 2005/0210008 A1 | 9/2005 | Tran et al. | |
| 2006/0242180 A1* | 10/2006 | Graf et al. | 707/101 |
| 2007/0061415 A1* | 3/2007 | Emmett et al. | 709/217 |
| 2008/0168135 A1* | 7/2008 | Redlich et al. | 709/204 |
| 2008/0288859 A1* | 11/2008 | Yuan et al. | 715/234 |

(Continued)

OTHER PUBLICATIONS

Friedman et al., *Bayesian Network Classifiers*, Machine Learning, 29, 131-163 (1997).

(Continued)

*Primary Examiner* — Wesner Sajous
(74) *Attorney, Agent, or Firm* — Orrick, Herrington & Sutcliffe, LLP

(57) ABSTRACT

A document processing system for accurately and efficiently analyzing documents and methods for making and using same. Each incoming document includes at least one section of textual content and is provided in an electronic form or as a paper-based document that is converted into an electronic form. Since many categories of documents, such as legal and accounting documents, often include one or more common text sections with similar textual content, the document processing system compares the documents to identify and classify the common text sections. The document comparison can be further enhanced by dividing the document into document segments and comparing the document segments; whereas, the conversion of paper-based documents likewise can be improved by comparing the resultant electronic document with a library of standard phrases, sentences, and paragraphs. The document processing system thereby enables an image of the document to be manipulated, as desired, to facilitate its review.

53 Claims, 26 Drawing Sheets

U.S. PATENT DOCUMENTS

2009/0228777 A1* 9/2009 Henry et al. .................. 715/230
2011/0145229 A1* 6/2011 Vailaya et al. ................ 707/723

OTHER PUBLICATIONS

Huttenlocker et al., *Comparing images using the Hausdorff distance*, IEEE Transactions on Pattern Analysis and Machine Intelligence, vol. 15, No. 9 (Sep. 1993).

Levenshtein, Vladimir, *Binary codes capable of correcting deletions, insertions, and reversals*, Doklady Akademii Nauk SSSR, 163(4):845-848, 1965 (Russian). English translation in Soviet Physics Doklady, 10(8):707-710 (Feb. 1966).

Simard, Le Cun, and Denker. *Efficient pattern recognition using a new transformation distance*, Advances in Neural Information Processing Systems, 5, pp. 50-58. Morgan Kaufmann (1993).

* cited by examiner funds into an iTunes Music Store account every month; and "Radio Charts," a feature that allows users to search and buy the top songs played on radio stations in major U.S. markets.

Peripheral Products —— 330

The Company sells certain associated Apple-branded computer hardware peripherals, including iSight™ digital video cameras, and a range of high quality flat panel TFT active-matrix digital color displays. The Company also sells a variety of third-party Macintosh compatible hardware products directly to end users through both its retail and online stores, including computer printers and printing supplies, storage devices, computer memory, digital video and still cameras, personal digital assistants, and various other computing products and supplies.

*iSight™* —— 332

The Company's iSight digital video camera enables video conferencing over broadband. iSight is a small, portable aluminum alloy camera with all audio, video and power provided by a single FireWire cable. iSight is designed to be center-mounted on the top of a computer screen and uses its integrated tilt and rotate mechanism to easily position the camera for natural, face-to-face video conferencing.

iSight features an autofocusing autoexposure F/2.8 lens which captures high-quality pictures and full-motion video. With its on-board processor, iSight automatically adjusts color, white balance, sharpness and contrast to provide high-quality images with accurate color reproduction in most lighting conditions. iSight also includes a dual-element microphone that suppresses ambient noise for clear digital audio.

*Displays*

In June 2004, the Company announced a family of widescreen flat panel displays featuring the 30-inch Apple Cinema HD Display, a widescreen active-matrix LCD with 2560-by-1600 pixel resolution, a 23-inch widescreen Apple Cinema Display with 1920-by-1200 pixel resolution and a 20-inch widescreen Apple Cinema Display with 1680-by-1050 pixel resolution. The displays feature dual FireWire and dual USB 2.0 ports built into the display and use the industry standard DVI interface for a pure digital connection with the Company's latest Power Mac and PowerBook systems. The Cinema Displays feature an aluminum design with a very thin bezel, suspended by an aluminum stand that allows viewing angle adjustment.

Software Products and Computer Technologies

320 funds into an iTunes Music Store account every month; and "Radio Charts," a feature that allows users to search and buy the top songs played on radio stations in major U.S. markets.

Peripheral Products — 330A — 390B — 350 — 390A — 360 — 380

The Company sells certain associated Apple-branded computer hardware peripherals, including iSight™ digital video cameras, and a range of high quality flat panel TFT active-matrix digital color displays. The Company also sells a variety of third-party Macintosh compatible hardware products directly to end users through both its retail and online stores, including computer printers and printing supplies, storage devices, computer memory, digital video and still cameras, personal digital assistants, and various other computing products and supplies.

*iSight*™ — 332A — 390D — 390E — 390C — 380 — 370

The Company's iSight digital video camera enables video conferencing over broadband. iSight is a small, portable aluminum alloy camera with all audio, video and power provided by a single FireWire cable. iSight is designed to be center-mounted on the top of a computer screen and uses its integrated tilt and rotate mechanism to easily position the camera for natural, face-to-face video conferencing.

iSight features an autofocusing, autoexposure F/2.8 lens which captures high-quality pictures and full-motion video. With its on-board processor, iSight automatically adjusts color, white balance, sharpness and contrast to provide high-quality images with accurate color reproduction in most lighting conditions. iSight also includes a dual-element microphone that suppresses ambient noise for clear digital audio.

*Displays* — 332B — 390G — 390F — 390H — 380

In June 2004, the Company announced a family of widescreen flat panel displays featuring the 30-inch Apple Cinema HD Display, a widescreen active-matrix LCD with 2560-by-1600 pixel resolution, a 23-inch widescreen Apple Cinema Display with 1920-by-1200 pixel resolution and a 20-inch widescreen Apple Cinema Display with 1680-by-1050 pixel resolution. The displays feature dual FireWire and dual USB 2.0 ports built into the display and use the industry standard DVI interface for a pure digital connection with the Company's latest Power Mac and PowerBook systems. The Cinema Displays feature an aluminum design with a very thin bezel, suspended by an aluminum stand that allows viewing angle adjustment.

Software Products and Computer Technologies — 330B — 390I — 380

| Item No. | Supplies/Services | Quantity | Unit | Unit Price | Amount |
|---|---|---|---|---|---|
| | Supplies or Services and Prices/Costs | | | | |
| 0001 | BASE YEAR - October 1, 2006 - September 30, 2007<br><br>The Contractor shall provide the services necessary for the operation of the Internet Assigned Numbers Authority (IANA) in accordance with the attached statement of work. | 1 | JB | 0.00 | 0.00 |
| 0002 | OPTION YEAR 1 - October 1, 2007 - September 30, 2008<br><br>The Contractor shall provide the services necessary for the operation of the Internet Assigned Numbers Authority (IANA) in accordance with the attached statement of work. | 1 | JB | 0.00 | 0.00 |
| 0003 | OPTION YEAR 2 - October 1, 2008 - September 30, 2009<br><br>The Contractor shall provide the services necessary for the operation of the Internet Assigned Numbers Authority (IANA) in accordance with the attached statement of work. | 1 | JB | 0.00 | 0.00 |
| 0004 | OPTION YEAR 3 - October 1, 2009 - September 30, 2010<br><br>The Contractor shall provide the services necessary for the operation of the Internet Assigned Numbers Authority (IANA) in accordance with the attached statement of work. | 1 | JB | 0.00 | 0.00 |
| 0005 | OPTION YEAR 4 - October 1, 2010 - September 30, 2011<br><br>The Contractor shall provide the services necessary for the operation of the Internet Assigned Numbers Authority (IANA) in accordance with the attached statement of work. | 1 | JB | 0.00 | 0.00 |

| Item No. | Supplies or Services and Prices/Costs Supplies/Services | Quantity | Unit | Unit Price | Amount |
|---|---|---|---|---|---|
| 0001 | BASE YEAR - October 1, 2006 - September 30, 2007 | 1 | JB | 0.00 | 0.00 |
| | The Contractor shall provide the services necessary for the operation of the Internet Assigned Numbers Authority (IANA) in accordance with the attached statement of work. | | | | |
| 0002 | OPTION YEAR 1 - October 1, 2007 - September 30, 2008 | 1 | JB | 0.00 | 0.00 |
| | The Contractor shall provide the services necessary for the operation of the Internet Assigned Numbers Authority (IANA) in accordance with the attached statement of work. | | | | |
| 0003 | OPTION YEAR 2 - October 1, 2008 - September 30, 2009 | 1 | JB | 0.00 | 0.00 |
| | The Contractor shall provide the services necessary for the operation of the Internet Assigned Numbers Authority (IANA) in accordance with the attached statement of work. | | | | |
| 0004 | OPTION YEAR 3 - October 1, 2009 - September 30, 2010 | 1 | JB | 0.00 | 0.00 |
| | The Contractor shall provide the services necessary for the operation of the Internet Assigned Numbers Authority (IANA) in accordance with the attached statement of work. | | | | |
| 0005 | OPTION YEAR 4 - October 1, 2010 - September 30, 2011 | 1 | JB | 0.00 | 0.00 |
| | The Contractor shall provide the services necessary for the operation of the Internet Assigned Numbers Authority (IANA) in accordance with the attached statement of work. | | | | |

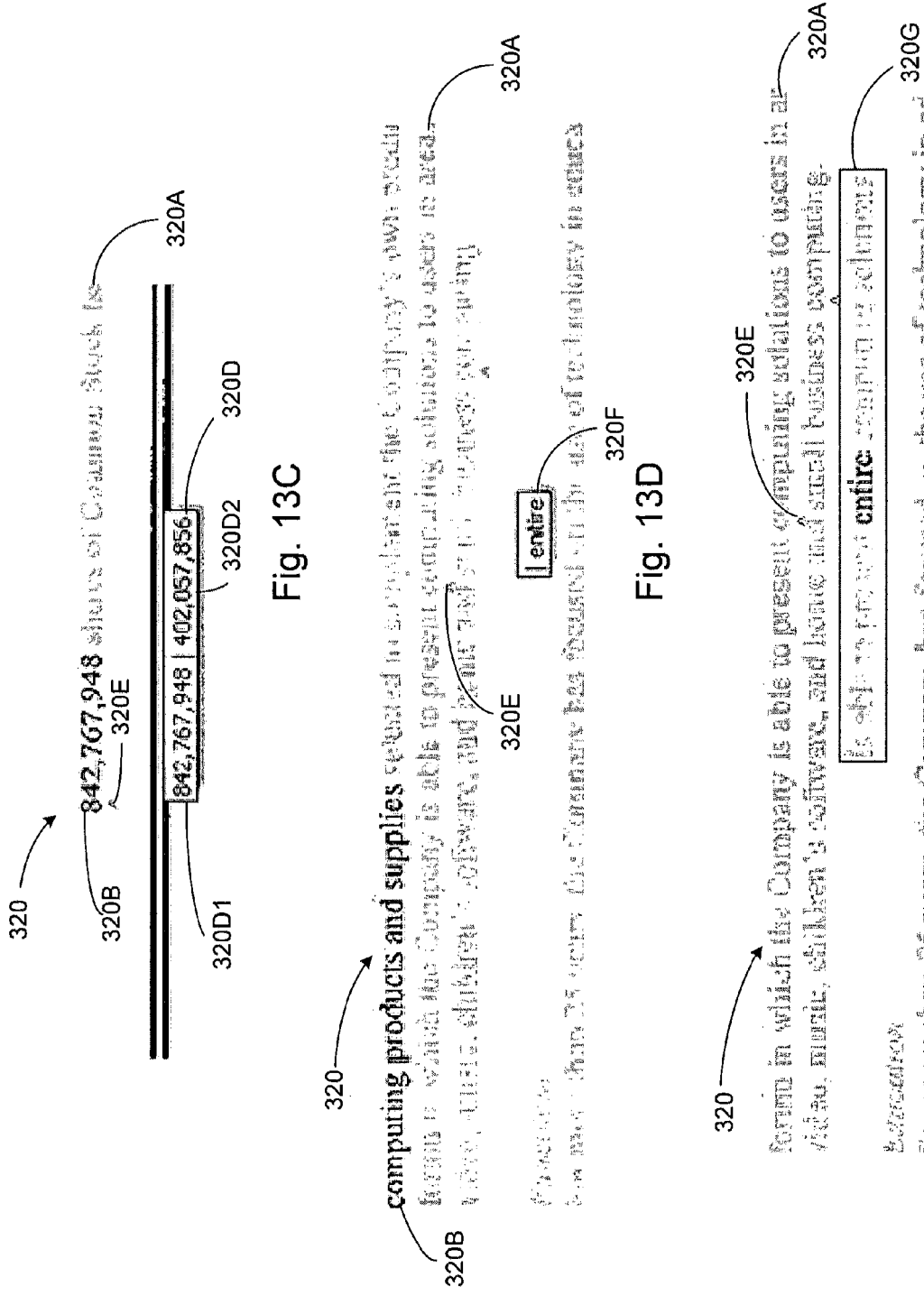

SYSTEM AND METHOD FOR COMPARING AND REVIEWING DOCUMENTS

CROSS-REFERENCE TO RELATED APPLICATIONS

This application is a continuation of U.S. application Ser. No. 12/240,793 filed Sep. 29, 2008 now abandoned, and claims the benefit of U.S. Provisional Application No. 61/057,955, filed Jun. 2, 2008, and U.S. Provisional Application No. 61/092,202, filed Aug. 27, 2008, which applications are hereby incorporated herein by reference.

FIELD

The present disclosure relates generally to document processing systems and more particularly, but not exclusively, to computer-aided systems and methods for facilitating document review.

BACKGROUND

Many business and legal practitioners have a requirement to review paper copies of documents to find important information. Many of those paper-based documents have an electric correlate, but some do not. In many cases, tens or hundreds of similar paper documents must be reviewed. One common type of document set contains sections of redundant text from one document to the next, with important information buried in this boilerplate text. People have difficulty recognizing both boilerplate and important text: the process is tedious, time-consuming, and error-prone. Reviewers also often need to gain an understanding of the types of issues mentioned in each document. Technology to support the full range of required functionality does not currently exist.

There are two major categories of current approaches to attempt to address these problems, both making simplifying assumptions. First, to process paper documents into readable text, Optical Character Recognition (OCR) software is typically used. However, the accuracy of existing OCR software suffers on the types of documents typical for the application environments we have studied. In these cases, documents have been faxed, copied, mutilated, or written on. On these documents, the word-level accuracy of state-of-the-art OCR software can be 20% or worse. This low accuracy level makes the document unreadable when displayed as recognized text words.

The second approach to address these problems is to use text processing, change tracking, document management, search, indexing, and summarization tools. There are several deficiencies in these tools. Some of them work only with electronically produced documents, while the example embodiments described herein address both paper and electronic documents. Others support only a single file format. Text analysis tools cannot read images, and even applying them to the result of OCR would reduce their accuracy and usefulness dramatically. Finally, tools that find differences between text segments in documents usually limit the extent of their search (e.g., they do not search in pages far away from the current page) when looking for matching segments of text. They also do not typically support the recognition of repeated text as needed, or the comparison of tabular and multi-dimensional information.

There has been much related work in computational linguistics and related fields applying statistical and machine learning techniques to natural language processing tasks. Some of this work is reported in Manning, C. et al., "Foundations of Statistical Natural Language Processing," The MIT Press (1999), the disclosure of which is hereby incorporated herein by reference in its entirety. Many approaches from machine learning involve building or training some sort of classifier to help make decisions about documents and the words or sentences they contain. Classifiers are statistical or symbolic models for dividing items (also called examples) into classes (also called labels), and are standard tools in artificial intelligence and machine learning.

To address the deficiencies discussed above, it would be desirable to provide a system and method for comparing and viewing electronic and paper-based text documents that is both accurate and efficient, that supports multiple file formats including scanned paper documents, that searches for similar text liberally within two documents, and that aids the user in analyzing each respective text document.

BRIEF DESCRIPTION OF THE DRAWINGS

FIG. 4C is a detail drawing illustrating an image of an exemplary electronic document, wherein a selected page of the exemplary document is associated with a contract page category.

FIG. 4D is a detail drawing illustrating the image of the exemplary electronic document of FIG. 4C, wherein the selected page has been segmented in accordance with an identified segment hierarchy in accordance with the contract page category.

FIG. 5A is a detail drawing illustrating an image of another exemplary electronic document, wherein a selected page of the exemplary document is associated with a table page category.

FIG. 5B is a detail drawing illustrating the image of the exemplary electronic document of FIG. 5A, wherein the selected page has been segmented in accordance with an identified segment hierarchy in accordance with the table page category.

FIG. 11 is a detail drawing illustrating an image of an exemplary electronic document, wherein a document segment of the selected page is associated with a concept classifier to enable concept searching for the document segment.

FIG. 13A is a detail drawing illustrating another alternative embodiment wherein the software tool permits an image of an electronic document to be altered to facilitate document review.

FIG. 13B is a detail drawing illustrating another alternative embodiment wherein the software tool permits an image of an electronic document to be altered to facilitate document review.

FIG. 13C is a detail drawing illustrating another alternative embodiment wherein the software tool permits an image of an electronic document to be altered to facilitate document review.

FIG. 13D is a detail drawing illustrating another alternative embodiment wherein the software tool permits an image of an electronic document to be altered to facilitate document review.

FIG. 13E is a detail drawing illustrating another alternative embodiment wherein the software tool permits an image of an electronic document to be altered to facilitate document review.

Figure 1:
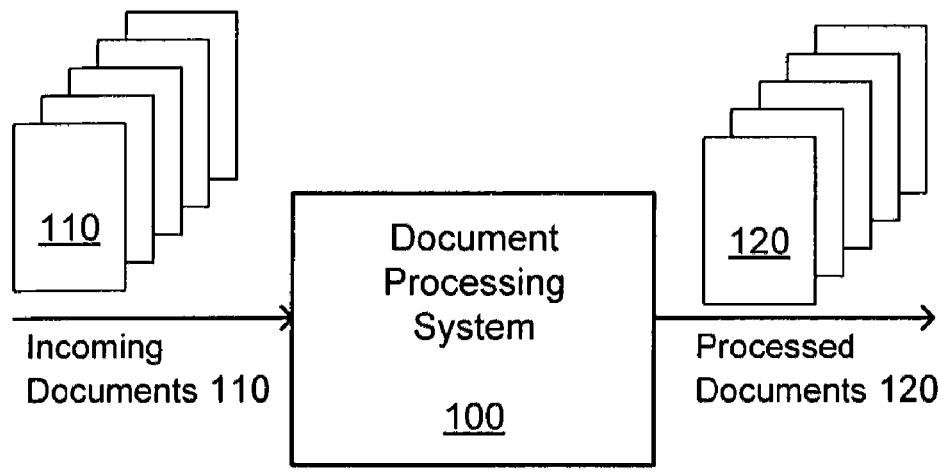
FIG. 1 is a top-level block diagram illustrating an exemplary embodiment of a document processing system that processes electronic documents.

It should be noted that the figures are not drawn to scale and that elements of similar structures or functions are generally represented by like reference numerals for illustrative purposes throughout the figures. It also should be noted that the figures are only intended to facilitate the description of the preferred embodiments of the present disclosure. The figures do not illustrate every aspect of the disclosed embodiments and do not limit the scope of the disclosure.

DETAILED DESCRIPTION OF THE PREFERRED EMBODIMENTS

Since currently-available OCR software provides limited accuracy and usefulness with paper-based text documents, and since current electronic text comparison tools are limited in scope and applicability, a document processing system and method for accurately and efficiently comparing and analyzing documents can prove desirable and provide a basis for a wide range of data applications. This result can be achieved, according to one embodiment disclosed herein, by a document processing system 100 as illustrated in FIG. 1.

Turning to FIG. 1, the document processing system 100 is shown as receiving one or more incoming documents 110 and provides corresponding processed documents 120. The incoming documents 110 can be provided from any conventional document source. Exemplary incoming documents 110 can include documents that are received an electronically generated document, as a printed document, a facsimile document, an emailed document, and/or a mailed document. The document processing system 100 can comprise any conventional type of processing system, such as a computer system, and can be provided in the manner set forth in co-pending U.S. patent applications, entitled "SYSTEMS AND METHODS FOR GENERATING AND MATCHING USER MODELS AND PROFILES," Ser. No. 11/277,028, filed on Mar. 20, 2006; and entitled "SYSTEMS AND METHODS FOR ANALYZING FINANCIAL STATEMENT INFORMATION," Ser. No. 11/678,010, filed on Feb. 22, 2007, which are assigned to the assignee of the present application and the respective disclosures of which are hereby incorporated herein by reference in their entireties.

Each incoming document 110 includes at least one section of textual content and can be received in any conventional manner, including in a paper form and/or an electronic form. If provided as a paper-based document, the incoming document 110 preferably is imaged to convert the paper-based document into an imaged document having a suitable electronic form. The paper-based document can be converted into the imaged document in any conventional manner, such as via commercially-available scanning software. An electronic document 300 (shown in FIG. 4A) therefore can comprise a document that is provided in an electronic form and/or a paper-based document that is converted into an electronic form.

The document processing system 100 processes the electronic document 300 to add cues for facilitating review of the associated incoming document 110. Many categories of documents, such as legal, accounting, and/or tax documents, often include one or more common passages with the same, or similar, textual content. For example, standard form contracts often include a plurality of boilerplate (or miscellaneous) provisions. The boilerplate provisions can be set forth at different locations and/or in different orders in the different contracts. The document processing system 100 therefore can facilitate the review of the incoming document 110 by identifying and classifying common text content between the incoming document 110 and at least one reference document, such as a second incoming document.

Figure 4A:
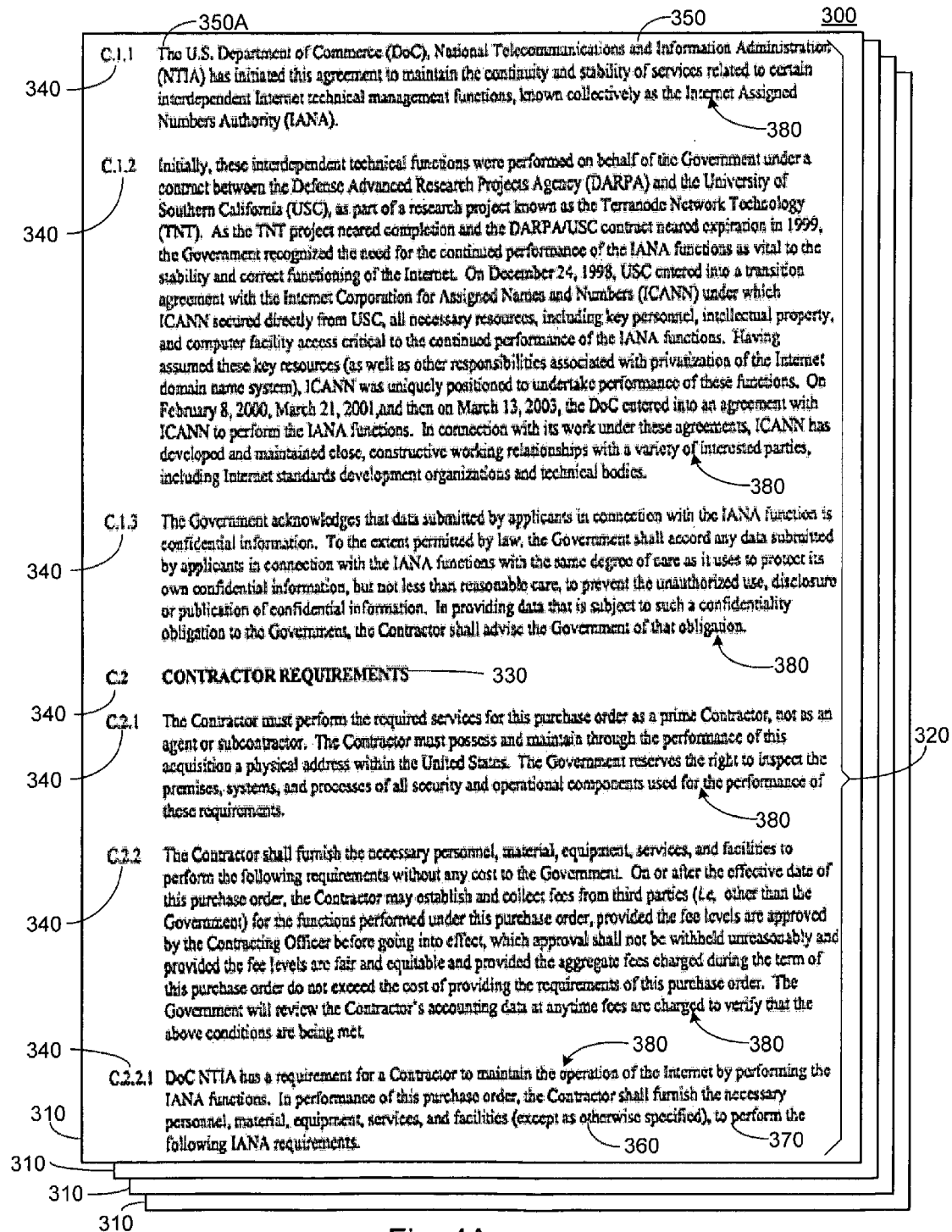
FIG. 4A is a detail drawing illustrating an image of an exemplary electronic document, wherein a selected page of the exemplary document is associated with a contract page category.

An image of an exemplary electronic document 300 is illustrated in FIG. 4A. More particularly, FIG. 4A illustrates a selected page 310 of an electronic document 300 that includes one or more pages 310. The electronic document 300 includes content derived from the associated incoming document 110 (shown in FIG. 1) and is provided in an electronic form. Although only one page 310 is shown in FIG. 4A for purposes of illustration, the electronic document 300 can include any suitable number of document pages 310. The electronic document 300 can comprise a document associated with one or more conventional document categories. Stated somewhat differently, each page 310 of the electronic document 300 can be conceptually associated with a selected document category, and the document categories can be uniform and/or different among the pages 310 of the electronic document 300. The selected page 310 of the electronic document 300 of FIG. 4A, for example, has characteristics consistent with a contract document and therefore can be associated with a contract document category; whereas, the selected page 310 of the electronic document 300 illustrated in FIG. 5A has characteristics consistent with a table document and can be associated with a table document category.

Each document page 310 can include text content 320. As illustrated in FIG. 4A, the text content 320 can vary in amount (or quantity) for each document page 310 and can include one or more words 350, phrases 360, sentences 370, paragraphs 380, and/or document sections 390. The electronic document 300 therefore can have several logical parts (or sections). Since textual content often includes a textual hierarchy, the words 350, phrases 360, sentences 370, and/or paragraphs 380 of the electronic document 300 likewise can be further divided into logical sub-parts. The logical sub-parts, in turn, may be still further divided into logical sub-sub-parts and so on. If the electronic document 300 has a conventional word-processing format, the textual hierarchy can be identified from selected indicia or other information included within the electronic document 300, such as section headings 330, section numberings 340, and/or format changes provided at a beginning region of each text section.

Figure 2:
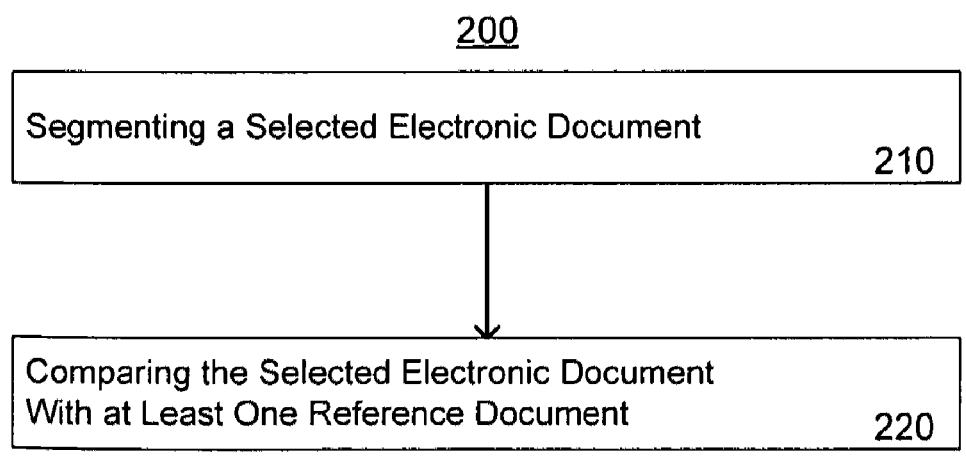
FIG. 2 is a top-level flow chart illustrating an exemplary embodiment of a document processing method by which the document processing system of FIG. 1 processes the electronic documents.

FIG. 2 illustrates an exemplary document processing method 200 for processing an electronic document 300 (shown in FIG. 4A) having text content 320 (shown in FIG. 4A) and being associated with a selected incoming document 110 (shown in FIG. 1). The document processing method 200 can include, at 210, segmenting the selected electronic document 300. At 220, the selected electronic document 300 can be compared with at least one electronic reference document, such as a reference electronic document 300R (shown in FIGS. 6A-C) associated with a second incoming document. For example, document segments 390 (shown in FIGS. 4B, 4D, 5B) from the selected electronic document 300 can be compared with document segments from the electronic reference document to facilitate the comparison. The document processing method 200 advantageously applies selected combinations of image features and document imaging techniques to accurately and efficiently compare and analyze documents and, thereby, facilitate document review.

If the document processing system 100 (shown in FIG. 1) is provided as a computer system in the manner set forth above, the document processing method 200 can comprise a set of executable instructions (or program code) that is stored in a memory system (not shown) of the computer system. Stated somewhat differently, the document processing method 200 can be implemented as a computer program product for use in conjunction with the computer system. The memory system can comprise any conventional type of volatile and/or nonvolatile memory system, such as any suitable electronic, magnetic, and/or optical storage media, without limitation. Exemplary storage media can include one or more static random access memories (SRAMs), dynamic random access memories (DRAMs), electrically-erasable programmable read-only memories (EEPROMs), FLASH memories, hard drives (HDDs), compact disks (CDs), and/or digital video disks (DVDs) of any kind. For example, the set of executable instructions can be stored in nonvolatile computer memory, such as a hard drive or a compact disk, and, when needed by the computer system, can be transferred into random access memory of the computer system. Although shown and described as being implemented in a general purpose computer that can be selectively activated and/or reconfigured by software, the document processing method 200 can be carried out in hardware, in firmware, or in more specialized apparatus.

Segmentation of Electronic Documents

As set forth above, the document processing method 200 can include, at 210, segmenting the selected electronic document 300. Advantageously, segmenting the selected electronic document 300 can provide the document segments 390 (shown in FIGS. 4B, 4D, 5B). In addition, this segmentation can include a segment hierarchy that reflects the textual hierarchy of the incoming electronic document 300. The logical parts (or sections) as identified by the document processing method 200 can correspond to any predetermined sequence of words 350 (shown in FIGS. 4A, 4C) within the textual content of the electronic document 300. For instance, exemplary logical parts can include a section, a paragraph 380 (shown in FIGS. 4A, 4C), and/or a sentence 370 (shown in FIGS. 4A, 4C). If the electronic document 300 is originally received by the document processing method 200 as an electronic document 300 having a conventional word-processing format, the document processing method 200 can employ a computational operation (or process that can readily recognize the segment hierarchy from section headings and/or format changes provided at a beginning region of each text section).

For other documents, such as paper-based documents, that are not originally received in an electronic form and/or with a conventional word-processing format, identification of a segment hierarchy within the associated electronic document 300 can be more involved. The document processing method 200 can infer whether a textual hierarchy exists for the electronic document 300 and, if so, can generate the associated segment hierarchy of the segment hierarchy. If a textual hierarchy is found to exist within the electronic document 300, the document processing method 200 can associate each relevant document segment 390 (shown in FIGS. 4B, 4D, 5B) with a hierarchical level. The various hierarchical levels can be designated via predetermined hierarchy level numbers, which identify a top level and one or more deeper levels of nesting within the segment hierarchy. In a preferred embodiment, the hierarchy level number for the top level can be assigned a value of zero; whereas, the hierarchy level numbers for the deeper levels can increase for each incremental level of nesting.

To facilitate the identification of the segment hierarchy within the electronic document 300, the document processing method 200 advantageously can apply classifiers to determine the segmentation of the electronic document 300. Any conventional type of classifier may be used to determine the segmentation of the electronic document 300. Exemplary classifiers can include Naïve Bayes (NB), decision tree, neural networks, K-nearest neighbor, and/or support vector machine classifiers. The classifiers can be built by hand and/or augmented with classifiers trained on labeled text in the manner set forth below with reference to concept classification. The classifiers can comprise statistical and/or symbolic models for dividing items (also called examples) into classes, and are standard tools in artificial intelligence and machine learning. Stated somewhat differently, the document processing method 200 can apply any classifier from the machine learning toolbox, such as probabilistic latent semantic analysis, also known as probabilistic latent semantic indexing; support vector machines; or non-graphical models such as decision trees in the manner disclosed by Mitchell, T., "Machine Learning," McGraw-Hill (1997), the disclosure of which is hereby incorporated herein by reference in its entirety.

When designing a classifier, one determines which features to use as input to represent items, and also what label or class to associate with its output. Classifiers can be binary and/or multi-class. Binary classifiers indicate that each input to the classifier is (or is not) a member of the class; whereas, multi-class classifiers choose one of several classes for examples. Multi-class classifiers likewise can be constructed by using a set of binary classifiers that "vote" to determine with which class an example should be labeled. For example, a text classifier might use some or all of the words in a document as its features and "Business"/"Sports"/"Other" as its output labels.

The classifiers preferably utilize at least one image-based feature and/or at least one text-based feature in determining whether a new document segment 390 (shown in FIGS. 4B, 4D, 5B) has started in the electronic document 300. Commercially-available imaging application programming interfaces (APIs), such as an Optical Character Recognition (OCR) software, can provide one or more of the image-based features. Other image-based features can be derived from the output of the imaging software and/or the image data itself. Table 1 illustrates selected exemplary image-based features suitable for use in classifiers. It will be appreciated that the image-based features included in Table 1 below are merely exemplary and not exhaustive.

TABLE 1

Exemplary Image-Based Features
Which fonts are in use (e.g., type, size, bold, italic, underline)
Number of fonts in use
Proportion of image (logos, pictures) versus text
Properties of a histogram of the number of black pixels in a selected region, which properties could indicate different density of text in different horizontal and/or vertical document regions
Extra white space before and/or after one or more words
Carriage returns
Number of horizontal and/or vertical lines
Number of horizontal and/or vertical white space gaps
Alignment of words (e.g., center, left, right)

Selected exemplary text-based features suitable for use in classifiers are shown in Table 2 below. The text-based features included in Table 2 below are merely exemplary and not exhaustive.

TABLE 2

Exemplary Text-Based Features
Occurrence of a given word (or word class)
Density of words on a page
Upper case versus lower case
Contextual information, including changes in font type, font size, and/or capitalization
Numbers
Currency
Date
Time
All capital letters
Quotation marks
Words and/or symbols indicating new sections (i.e., A.1, 1.1, Roman numerals)

The classifiers likewise can use one or more semantic features in determining whether a new document segment 390 (shown in FIGS. 4B, 4D, 5B) has started in the electronic document 300. The semantic features can comprise non-image features beyond ordinary words in the electronic document 300. Examples of semantic features can include the font type and/or the presence of a number. As desired, the document processing method 200 can use trained classifiers and/or hand-built classifiers, wherein each classifier comprises a selected combination of one or more image-based features, text-based features, and/or semantic features in accordance with the goal(s) of the classifier.

Figure 3A:
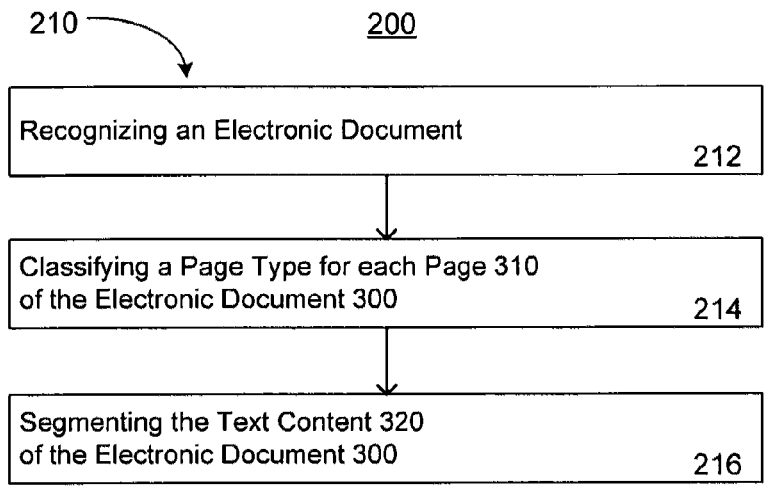
FIG. 3A is a flow chart illustrating an embodiment of segmenting a selected electronic document in accordance with the document processing method of FIG. 2.

A flow chart illustrating one exemplary manner by which the document processing method 200 can segment the selected electronic document 300 is illustrated in FIG. 3A. Turning to FIG. 3A, segmenting the selected electronic document 300 (shown in FIGS. 4A, 4C) can include, at 212, recognizing the electronic document 300, at 214, classifying a page type for the electronic document 300, and/or, at 216, segmenting the text content 320 (shown in FIGS. 4A, 4C) of the electronic document 300.

If the electronic document 300 is originally received by the document processing method 200 as an electronic document 300 having a conventional word-processing format, the document processing method 200, at 212, can readily recognize the electronic document 300. Recognizing the electronic document 300 also can include correlating (and/or indexing) an image of the electronic document 300 with the text content 320 of the electronic document 300 in the manner shown at 212 in FIG. 3A. To correlate (and/or index) the image and the text content 320 of the electronic document 300, the document processing method 200 preferably groups characters within the text content 320 into words 350 (shown in FIGS. 4A, 4C). Recognizing the electronic document 300 likewise can include storing selected information, such as location, font size, and/or font type, for the words 350 as desired. Thereby, the document processing method 200 advantageously can support document processing functions such as copying, word finding, and/or display comparison.

Figure 3B:
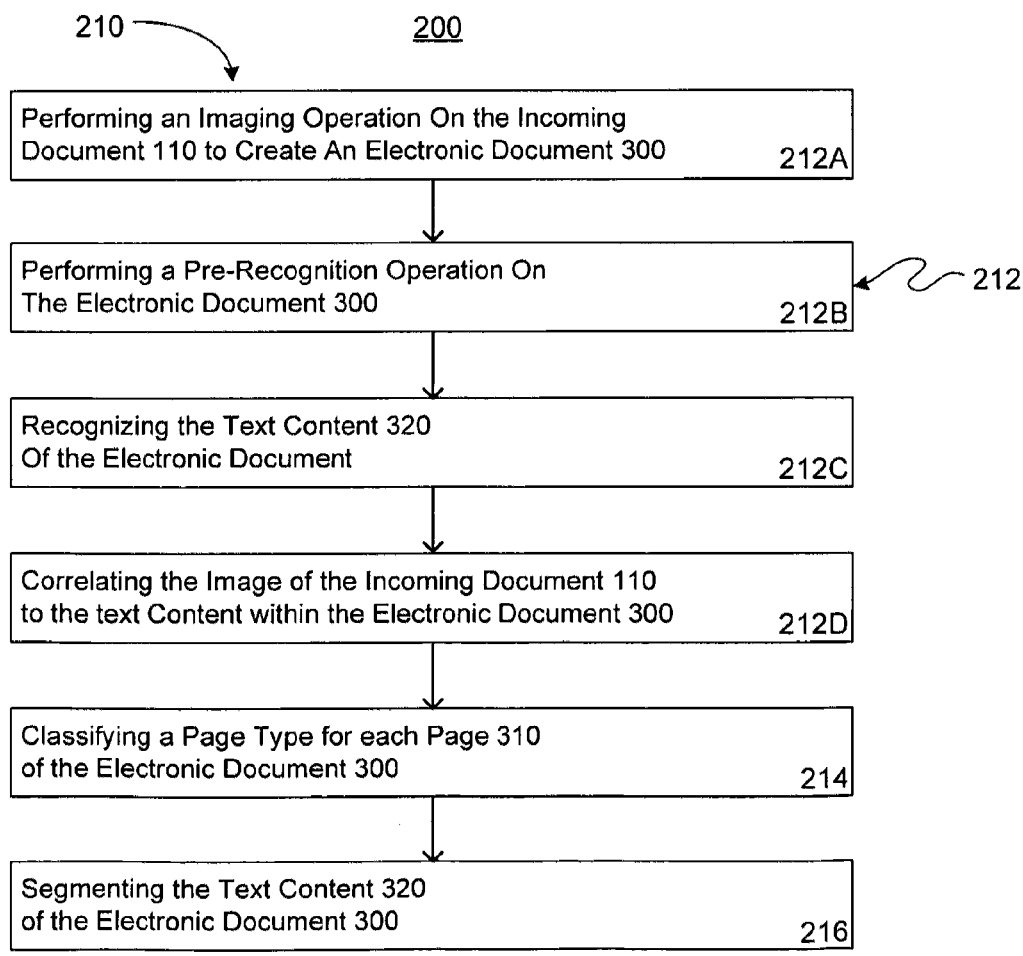
FIG. 3B is a flow chart illustrating an alternative embodiment of segmenting the electronic document of FIG. 3A, wherein the electronic document comprises a paper-based document that is converted into an electronic form.

For other document types, such as paper-based documents, that are not originally received in an electronic form with a conventional word-processing format, recognizing the electronic document 300, at 212, can be more involved. Recognizing the electronic document 300, at 212, for example, can include imaging these other documents to provide the electronic document 300 in the manner set forth above. Turning to FIG. 3B, the document processing method 200 is shown, at 212D, as comprising recognizing the text content 320 of the electronic document 300. Recognizing the text content 320 of the electronic document 300, at 212D, preferably enables individual characters and/or words 350 within the electronic document 300 to be identified.

As desired, the document processing method 200 can include one or more additional operations for facilitating the recognition of the electronic document 300. Recognizing the electronic document 300 of FIG. 3B includes performing, at 212A, an imaging operation on the incoming document 110 to create the electronic document 300. For example, the electronic document 300 can be created by performing a scanning operation on an incoming document 110 (shown in FIG. 1). Likewise, recognizing the electronic document 300 is shown in FIG. 3B as having at least one pre-recognition operation, such as a pre-recognition process, at 212B, in conjunction with the imaging (or conversion), at 212A, of the incoming document 110. The document processing method 200, for example, can include performing such processes as de-noising, de-skewing, and the like. The pre-recognition operations preferably facilitate the recognition of the incoming document 110 and/or improve the image quality of the resultant electronic document 300.

In addition, and/or alternatively, recognizing the electronic document 300 can include correlating image to text, at 212D. Correlating image to text, at 212D, permits the individual characters identified during recognition of the electronic document 300, at 212, to be grouped into words 350. For example, the text content 320 can be a logical part of the incoming electronic document 300 and preferably comprises a sequence of contiguous character strings derived from the incoming document 110. Each character string, in turn, can include a contiguous sequence of characters with no intervening spaces. Other information, such as font type, font size, and location within the electronic document 300, can be stored for each word 350. By correlating image to text, at 212D, the document processing method 200 can support enhanced document operations. Exemplary enhanced document operations can include copying, word finding, and compare display.

FIGS. 3A-B illustrate that segmenting the selected electronic document 300 likewise can include, at 214, classifying (or categorizing) a page type (or page category) for each page 310 of the electronic document 300. Exemplary page types can include one or more of the following page types: "Table," "Email," "Contract," and/or "Figure." Alternatively, the page types can include user defined page types or labels. In a preferred embodiment, the selected electronic document 300 can be segmented based upon a page categorization classifier that incorporates a selected combination of one or more image-based features, text-based features, and/or semantic features as discussed in more detail above. The features of the page categorization classifier used to label a selected page 310 of the electronic document 300 preferably include a page class label associated with a preceding page within the electronic document 300, wherein the page class label for the first page of the electronic document 300 is associated with a null (or zero) value. For electronic documents 300 provided as a result of conversion of a paper-based document, many conventional imaging processes, such as OCR processing, reliably detect page breaks within the paper-based document. Accordingly, determining the presence of a new page within the resultant electronic document 300 typically is straightforward.

Figure 4B:
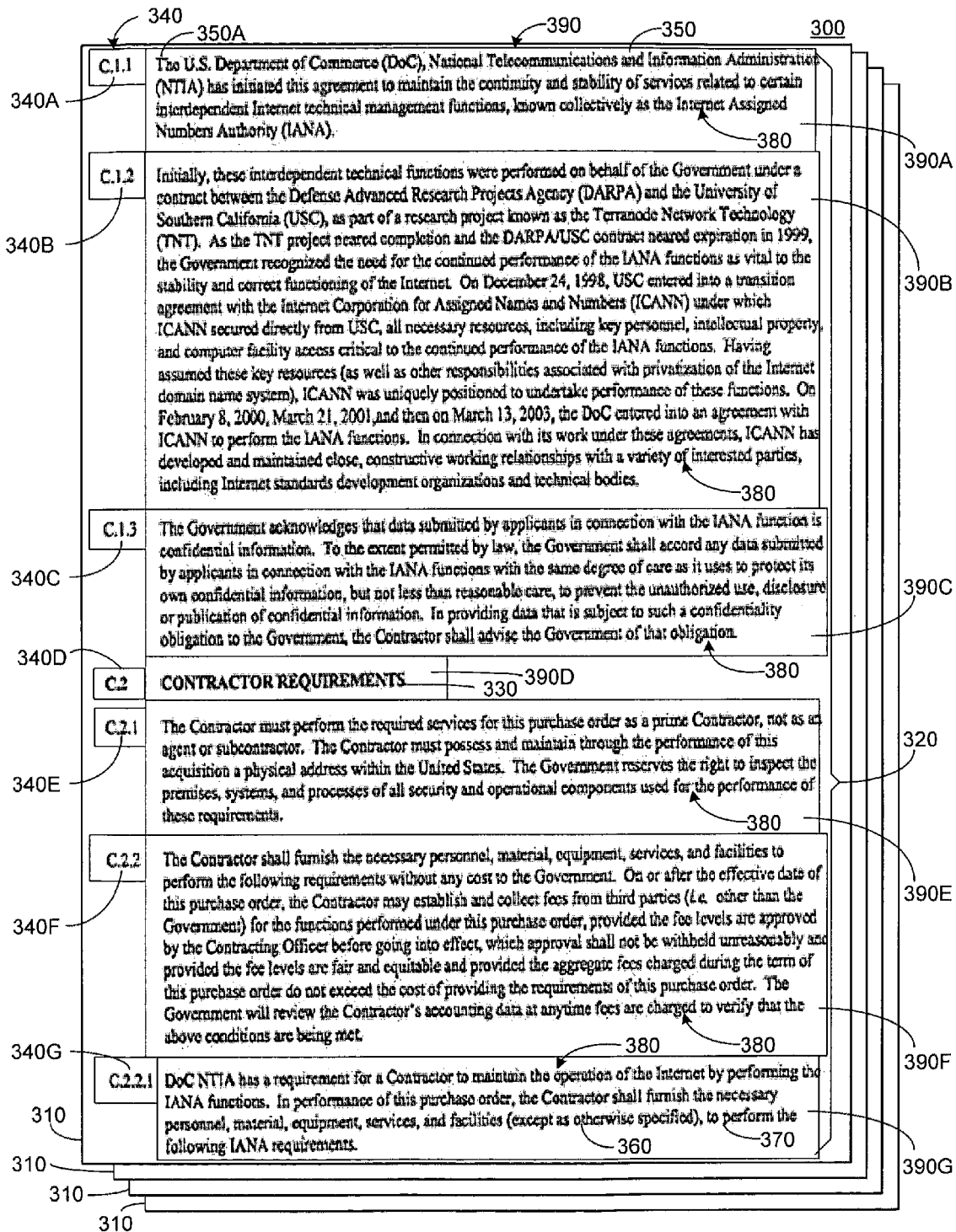
FIG. 4B is a detail drawing illustrating the image of the exemplary electronic document of FIG. 4A, wherein the selected page has been segmented in accordance with an identified segment hierarchy in accordance with the contract page category.

Segmenting the text content 320 of the electronic document 300, shown at 216 in FIGS. 3A-B, can include dividing the electronic document 300 into document segments 390 (shown in FIGS. 4B, 4D, 5B). The document segments 390 preferably correspond with the logical parts (or sections), such as the words 350, phrases 360, sentences 370, and/or paragraphs 380 (collectively shown in FIG. 4A), as if the document processing method 200 had direct access to the incoming document 110 (shown in FIG. 1) associated with the electronic document 300. Alternatively, user could provide labels of "ground truth" which establish where segment boundaries actually occur as well as hierarchy level. To divide the electronic document 300 into document segments 390, a segmentation classifier (not shown) is applied to the electronic document 300. The segmentation classifier preferably differs from the page type (or classifier) and can include one or more of the image-based features, text-based features, and/or semantic features discussed in more detail above.

In addition, the segmentation classifier likewise can include as a feature the class of the page containing the word as determined by the page categorization classifier. Blocks of text content 320 thereby can be identified via the segmentation classifier. Advantageously, segmenting the text content 320 of the electronic document 300 facilitates further processing of the electronic document 300 by the document processing method 200. Segmenting the text content 320, for example, can save time during a subsequent comparison of the electronic document with an electronic reference document, such as a reference electronic document 300R (shown in FIGS. 6A-C) associated with a second incoming document, and/or can improve a quality of the comparison by comparing document segments 390 from the selected electronic document 300 and the electronic reference document.

The segmentation classifier advantageously can create a segment hierarchy among the document segments 390. The number of hierarchical levels within the segment hierarchy can be set to any suitable value, as desired. The various hierarchical levels of the segment hierarchy can be designated via predetermined hierarchy level numbers, which identify a top level and one or more deeper levels of nesting within the segment hierarchy. In a preferred embodiment, the hierarchy level number for the top level can be assigned a value of zero; whereas, the hierarchy level numbers for the deeper levels can increase for each incremental level of nesting. For example, a first word 350A (shown in FIGS. 4A, 4C) of the first page of the electronic document 300 can be defined, by default, to start a new document segment 390 at the top level (or level 0) of the segment hierarchy. Each subsequent word 350 in the electronic document 300 thereby can be classified as continuing the document segment 390, starting a new document segment 390 at the same hierarchical level, starting a new document segment 390 at a lower hierarchical level, or starting a new document segment 390 at a higher hierarchical level, if any.

Returning to FIG. 4A, the process of segmenting the selected electronic document 300 can be illustrated with reference to the image of the page 310 of the electronic document 300. As set forth above, the electronic document 300 includes text content 320 that is derived from the associated incoming document 110 (shown in FIG. 1) and is provided in an electronic form. The text content 320 of the selected page 310 is shown as including a plurality of words 350, phrases 360, sentences 370, and paragraphs 380 and therefore has several logical parts (or sections) with a textual hierarchy. As shown in FIG. 4A, the selected page 310 has a large number of words 350 and includes section formatting, such as section heading 330 and section numberings 340. Based upon the large number of words 350, the section formatting, and the other features from Tables 1 and 2, the document processing method 200 (shown in FIG. 2), while classifying a page type for the selected page 310 of the electronic document 300, would associate a page type of "Contract" with the selected page 310.

Upon associating the page type of "Contract" with the selected page 310, the document processing method 200 can segment the text content 320 of the electronic document 300 in the manner shown in FIG. 4B. The document processing method 200 thereby can divide the text content 320 of the selected page 310 into document segments 390, identifying blocks of text content 320 and, if appropriate, creating a segment hierarchy among the document segments 390 in the manner set forth above. As a result, each document segment 390 can comprise any suitable portion of the electronic document 300 and can include, for example, one or more words 350, phrases 360, sentences 370, paragraphs 380, pages 310, and/or larger (or smaller) document portions as desired.

The paragraphs 380 that form the document segments 390 likewise are illustrated in FIG. 4B as being associated with the section heading 330 and the section numberings 340. Accordingly, the document processing method 200 can determine that creating a segment hierarchy among the document segments 390 is appropriate for the selected page 310. The document processing method 200 can initially identify the section heading 330 and associate the section heading 330 with the top level (or level 0) of the segment hierarchy. The document processing method 200 likewise can determine that section numbering 340D corresponds with section heading 330.

As shown in FIG. 4B, the section numbering 340D has a format of C.2, indicating that the section heading 330 corresponds to Section C, Part 2 of the electronic document 300. The format of the section numbering 340D indicates that the section numberings 340 with the format of C.x, such as C.1, C.2, C.3, ..., C.n, each would be associated with the same top level (or level 0) of the segment hierarchy as the section numbering 340D. Similarly, the format of the section numbering 340 likewise indicates that section numberings 340A, 340B, 340C, 340E, and 340F with a format of C.x.y, such as C.1.1, C.1.2, C.1.3, ..., C.1.n, C.2.1, C.2.2, C.1.3, ..., C.1.m, each can be associated with the next level (or level 1) of the segment hierarchy. Stated somewhat differently, section numberings 340 with the format of C.x.y comprise one level of nesting deeper than the section numbering 340D within the segment hierarchy. Accordingly, the section numbering 340A, 340B, 340C, 340E, and 340F as illustrated in FIG. 4B each are associated with that level (or level 1) of the segment hierarchy and are one level of nesting deeper than the section numbering 340D. In the manner set forth above, the section numbering 340G with a format of C.x.y.z, such as C.2.2.1, are two levels of nesting deeper than the section numbering 340D and are associated with the same level (or level 2) of the segment hierarchy.

Based upon the format of section numberings 340, the document processing method 200 can create a segment hierarchy, wherein the section heading 330 is associated with the top level (or level 0) of the segment hierarchy. The document segments 390A, 390B, 390C, 390E, and 401F correspond with the section numberings 340A, 340B, 340C, 340E, and 340F, respectively, and are associated with that level (or level 1) of the segment hierarchy. Within the segment hierarchy, level 1 is one level of nesting deeper than level 0. Similarly, the document segment 390G corresponds with the section numbering 340G and is two levels of nesting deeper than the section numbering 340D. The document processing method 200 thereby can create a segment hierarchy for the document segments 390 provided on each page 310 of the electronic document 300.

FIGS. 4C-D provide another example of the manner by which the document processing method 200 can segment a selected page 310 of the electronic document. The electronic document 300 includes text content 320 that is derived from the associated incoming document 110 (shown in FIG. 1) and is provided in an electronic form. The text content 320 of the selected page 310 is shown as including a plurality of words 350, phrases 360, sentences 370, and paragraphs 380 and therefore has several logical parts (or sections) with a textual hierarchy. As shown in FIG. 4C, the selected page 310 has a large number of words 350 and includes section formatting, such as section heading 330 and section subheadings 332. Based upon the large number of words 350, the section formatting, and the other features from Tables 1 and 2, the document processing method 200 (shown in FIG. 2), while classifying a page type for the selected page 310 of the electronic document 300, would associate a page type of "Contract" with the selected page 310.

Upon associating the page type of "Contract" with the selected page 310, the document processing method 200 can segment the text content 320 of the electronic document 300 in the manner shown in FIG. 4D. The document processing method 200 thereby can divide the text content 320 of the selected page 310 into document segments 390, identifying blocks of text content 320 and, if appropriate, creating a segment hierarchy among the document segments 390 in the manner set forth above. Each document segment 390 can comprise any suitable portion of the electronic document 300 and can include, for example, one or more words 350, phrases 360, sentences 370, paragraphs 380, pages 310, and/or larger (or smaller) document portions as desired. Since the large number of words 350 of the selected page 310 are grouped into the plurality of paragraphs 380, the document processing method 200 can divide the text content 320 of the selected page 310 into document segments 390A, C, E, F, H based upon the paragraphs 380 of the selected page 310. Stated somewhat differently, the paragraphs 380 can form the document segments 390A, C, E, F, H.

The paragraphs 380 that form the document segments 390 likewise are illustrated in FIG. 4D as being associated with the section heading 330 and the section subheadings 332. The bold and large font formatting of the "Peripheral Products" section heading 330A and "Software Products and Computer Technologies" section heading 330 B, in addition to the spacing and the short phrase, indicate that a new, high level segment (level 0) is beginning Likewise, italic, short headings 332A, 332B indicate a segment at the next level down (level 1) is beginning Accordingly, the document processing method 200 can determine that creating a segment hierarchy among the document segments 390 is appropriate for the selected page 310. The document processing method 200 can initially identify the section heading 330 and associate the section heading 330A with the top level (or level 0) of the segment hierarchy. The document processing method 200 likewise can determine that subsection headings 332A, 332B corresponds with section heading 330A.

FIGS. 5A-B provide a further example of the manner by which the document processing method 200 can segment a selected page 310 of the electronic document 300. Turning to FIG. 5A, the electronic document 300 is shown as including text content 320 that is derived from an associated incoming document 110 (shown in FIG. 1) and is provided in an electronic form in the manner set forth in more detail above. The selected page 310 is illustrated as having a large number of horizontal lines 410 and a large number of vertical lines 420. As shown in FIG. 5A, the vertical lines 420 form a plurality of vertical columns (or bands) 450 within the selected page 310, and the text content 320 is at least partially bounded by one or more of the horizontal lines 410 and/or the vertical lines 420. The text content 320 of the selected page 310 is illustrated as including at least one section heading 440, a plurality of section sub-headings 450 being associated with each of the section headings 440, and a plurality of column entries 460, 470, and 480, in turn, being associated with the respective section sub-headings 450.

The document processing method 200 segments the selected page 310 by classifying a page type for the selected page 310 and then segmenting the text content 320. Here, the document processing method 200 can classify a page type by generating the features of Table 1 and Table 2. This would include a pixel histogram (not shown) of the selected page 310 via the pixel histogram feature set forth above in Table 1. The pixel histogram would show that the selected page 310 has a high concentration of the text content 320 in several narrow vertical columns of the selected page 310. For example, a high concentration of the text content 320 appears in the vertical columns 450 associated with section sub-heading 450A entitled "Supplies/Services" of FIG. 5A. The document processing method 200 likewise can consider the large number of horizontal and vertical lines 410, 420 presented on the selected page 310 to classify the page type for the selected page 310. Based upon the large number of horizontal and vertical lines 410, 420 in conjunction with the pixel histogram and the other features, the document processing method 200, while classifying a page type for the selected page 310 of the electronic document 300, therefore would associate a page type of "Table" with the selected page 310.

Upon associating the page type of "Table" with the selected page 310, the document processing method 200 can segment the text content 320 of the electronic document 300 in the manner shown in FIG. 5B. The document processing method 200 thereby can divide the text content 320 of the selected page 310 into document segments 390, identifying blocks of text content 320 and, if appropriate, creating a segment hierarchy among the document segments 390 in the manner set forth above. As set forth above, the text content 320 of the selected page 310 is grouped into the section heading 440, section sub-headings 450, and column entries 460, 470, and 480. The document processing method 200 therefore can divide the text content 320 of the selected page 310 into document segments 390 based upon the section heading 440, section sub-headings 450, and column entries 460, 470, and 480. Stated somewhat differently, the section heading 440, section sub-headings 450, and column entries 460, 470, and 480 can respectively form document segments 392, 394, and 396.

As discussed above with reference to FIG. 5A, the format of the text content 320 shown in FIG. 5B includes a section heading 440, a plurality of section sub-headings 450 being associated with the section heading 440, and a plurality of column entries 460, 470, and 480, in turn, being associated with the respective section sub-headings 450. Accordingly, the document processing method 200 can determine that creating a segment hierarchy among the document segments 390 is appropriate for the selected page 310. Based upon the format of the text content 320, the document processing method 200 can initially identify the document segment 392 that is associated with the section heading 440 as corresponding with the top level (or level 0) within the segment hierarchy. The document segment 392 thereby corresponds with the top level (or level 0) within the segment hierarchy.

The document processing method 200 likewise can identify the section sub-headings 450 as being inferior in the segment hierarchy to the section heading 440 based upon the format of the text content 320. The column entries 460, 470, and 480 correspond with the section sub-headings 450 and are associated with the same level (or level 2) of the segment hierarchy. Within the segment hierarchy, level 2 is two level of nesting deeper than level 0. The column entries 460, 470, and 480 can form document segments 396 and are associated with the same level (or level 2) within the segment hierarchy. The document processing method 200 thereby can create a segment hierarchy for the document segments 390 provided on each page 310 of the electronic document 300. Therefore, the document processing method 200, when segmenting the selected page 310 of the electronic document 300, advantageously provides a label for each page 310 of the electronic document 300 as determined by the one or more page classifiers as well as a set of document segments 390 as determined by the segment classifiers.

Segmentation of the incoming electronic document 300 can provide several advantages. For example, segmentation can facilitate subsequent processing of the incoming electronic document 300 by the document processing system 100. If the document processing method 200 includes comparing the incoming electronic document 300 with an electronic reference document, the incoming electronic document 300 can be divided into document segments 390, which can be compared with document segments from the electronic reference document. By comparing document segments, rather than the electronic documents 300 in their entireties, the complexity of the comparison operation (or process) advantageously can be reduced.

Segmentation likewise can support generation and presentation of a table of contents for the incoming electronic document 300 during review. The classification of the pages 310 can facilitate production of a table of contents or other type of indexing guide for use with the electronic document 300. For example, an entry in the table of contents can be created for the start of each document segment 390, and the entry can be indented in an appropriate matter for corresponding with the associated hierarchical level within the segment hierarchy. The first few words 350 (shown in FIGS. 3A-B) of the document segment 390 likewise can be used to provide a textual entry in the table of contents. The table of contents can include textual entries associated with any desired hierarchical level within the segment hierarchy. The document processing system 100 thereby can facilitate document review by enabling presentation of tables of contents for paper-based and other documents for which physical (and/or more-traditional) tables of contents are unavailable.

Comparison of Electronic Documents

Returning briefly to FIG. 2, the document processing method 200 can include, at step 220, comparing the selected electronic document 300 with at least one electronic reference document, such as a reference electronic document 300R (shown in FIGS. 6A-C) associated with a second incoming document. One goal of the document processing method 200 includes comparing pairs of incoming documents 110 (shown in FIG. 1) such that the similarities and/or differences between the incoming documents 110 can be presented to a document reviewer or other user. One skilled in the art would readily recognize that segmenting, at step 210, is not necessary in order to compare the selected electronic document 300, and also that segmenting, at step 210, could result in the entire document being considered to be a single segment.

In a preferred embodiment, this goal can be framed as comprising identifying one or more logical parts (or sections), such as the words 350, phrases 360, sentences 370, and/or paragraphs 380 (collectively shown in FIG. 4A), from an original incoming document that are similar to and/or different (for a given span of words 350 and/or symbols) as compared to the logical parts (or sections) of a reference incoming document. The original and reference incoming documents can be converted, as necessary, in the manner set forth in more detail above to provide an original electronic document 300O (shown in FIG. 6A) and a reference electronic document 300R (shown in FIG. 6A). In the manner set forth with reference to the incoming documents 110 of FIG. 1, the original and reference incoming documents each can be provided from any conventional document source and can be received, for example, as a printed document, a facsimile document, an emailed document, and/or a mailed document.

By comparing the text content 320 (shown in FIG. 4A) of the original electronic document 300O with the text content 320 of the reference electronic reference document 300R, the document processing method 200 can detect, identify, and/or present textual similarities and/or differences between the original and reference electronic documents 300O, 300R. While each of the associated incoming documents 110 can include multiple logical portions, some of which are unique, many parts of the incoming documents 110 can comprise a filled-in template of a master document and/or can include standard sections that exactly (or closely) match document sections 390 (shown in FIGS. 4B, 4D, 5B) of a second document. For example, several different versions of a selected incoming document 110 can be produced and/or edited by one or more different people. It could prove advantageous to compare the different versions of the incoming document 110, even if the different versions are provided in different formats and/or originate from different word processing applications. The different versions of the selected incoming document 110 to be compared likewise can originate in a variety of conventional forms, including in a paper form and/or an electronic form.

In contrast with conventional document comparison techniques, the document comparison of the document processing method 200 can examine a larger span of the text content 320 of the original and reference electronic documents 300O, 300R when performing the document comparison. It can also examine a wider number of candidate sections, even if those segments are in multiple document locations, which can then be combined in various ways in order to find matching segments in 300R for a given section of 300O. Further, the document processing method 200 advantageously can identify the same, or similar, textual content within the text content 320 of the original and reference electronic documents 300O, 300R even if the occurrences of the same, or similar, textual content occur in different contexts in the original and reference electronic documents 300O, 300R. The original and reference electronic documents 300O, 300R preferably are segmented in the manner set forth in more detail above to facilitate identification of the same, or similar, textual content within the text content 320 of the original and reference electronic documents 300O, 300R and to reduce the complexity of the comparison process.

The results of the comparison can be presented in any conventional manner. For example, each of the incoming documents 110 can be presented simultaneously, such as on a video display and/or on a printed page. The results of the comparison typically are presented from the perspective of one of the incoming documents 110. Although shown and described with reference to original and reference incoming documents for purposes of illustration only, the incoming documents 110 do not need to be related in terms of having a common origin. The original and reference incoming documents, in other words, can comprise any arbitrary pair of incoming documents 110 that can originate from the same person and/or different persons and that are to be compared. In addition, the comparison of the original and reference incoming documents likewise is shown and described in terms of pairs of incoming documents 110 for purposes of illustration only. The document processing method 200 can compare any suitable number of incoming documents 110 without limitation.

Figure 6A:
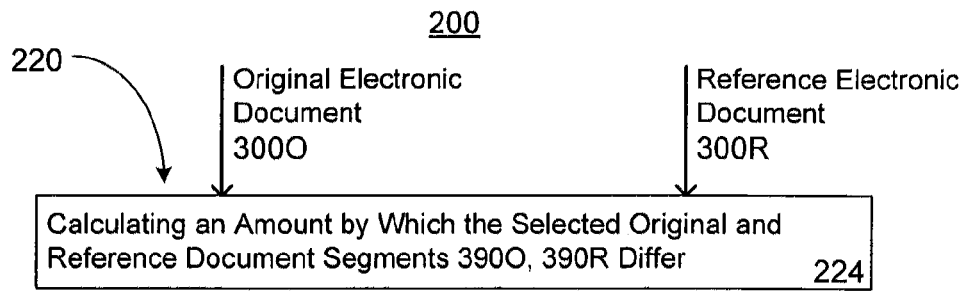
FIG. 6A is a flow chart illustrating one embodiment of comparing an original electronic document with a reference electronic document in accordance with the document processing method of FIG. 2.
Figure 6B:
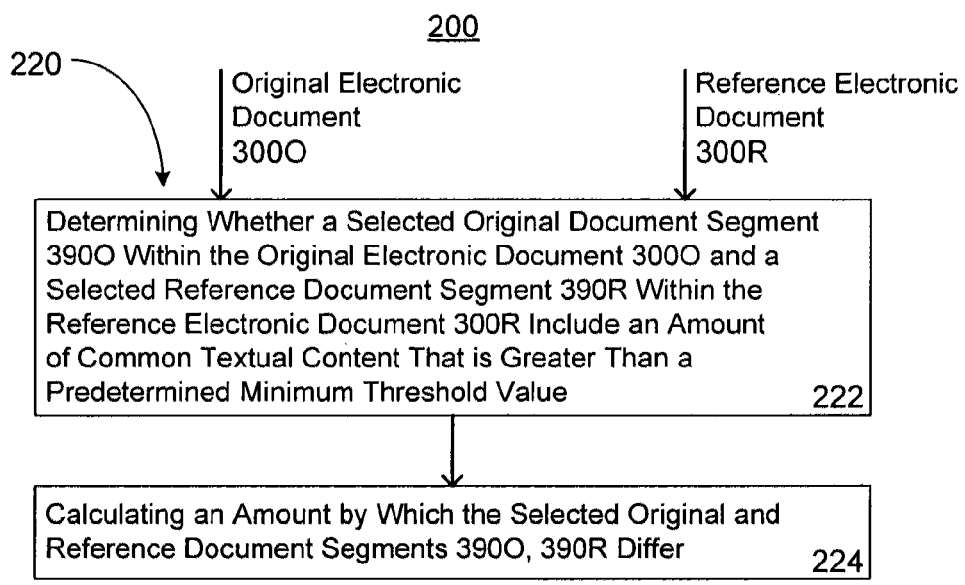
FIG. 6B is a flow chart illustrating an alternative embodiment of comparing the original electronic document with the reference electronic document of FIG. 6A, wherein the comparison includes excluding very different segments from further comparison.
Figure 6C:
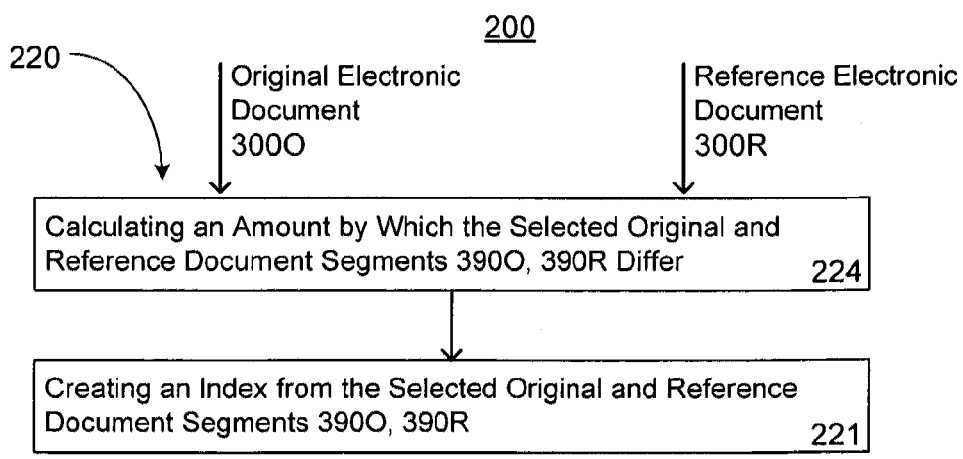
FIG. 6C is a flow chart illustrating another alternative embodiment of comparing the original electronic document with the reference electronic document of FIG. 6A, wherein an index is created from the document segments in the original electronic document to the document segments in the reference electronic document.

As desired, the results of the comparison of the original electronic document 300O and the reference document 300R likewise can be stored (as in step 221 of FIG. 6C). The stored comparison results can subsequently be used to support navigation of the original electronic document 300O and/or the reference document 300R. For example, the stored comparison results can facilitate locating matching text within the original electronic document 300O and the reference document 300R during document review.

A flow chart illustrating one exemplary manner by which the document processing method 200 can compare an original electronic document 300O with a reference electronic reference document 300R is illustrated in FIG. 6A. The original electronic document 300O and the reference electronic reference document 300R each have been recognized and segmented in the manner set forth in more detail above with reference to FIGS. 3A-B. Thereby, the original electronic document 300O includes one or more original document segments 390O; whereas, the reference electronic document 300R includes one or more reference document segments 390R. The comparison of the original electronic document 300O and the reference electronic reference document 300R can be performed by comparing the original document segments 390O with the reference document segments 390R.

The comparison identifies matches, and preferably the best matches, between the original document segments 390O with the reference document segments 390R. In the manner set forth in more detail above with reference to FIGS. 3A-B, the original and reference document segments 390O, 390R each preferably correspond with the logical parts (or sections), such as the words 350, phrases 360, sentences 370, and/or paragraphs 380 (collectively shown in FIG. 4A), of the original and reference electronic documents 300O, 300R.

Turning to FIG. 6A, comparing, at 220, the original electronic document 300O with the reference electronic reference document 300R can include, at 224, calculating an amount by which the selected original document segment 390O and the selected reference document segment 390R differ. FIG. 6B shows that comparing the original electronic document 300O with the reference electronic reference document 300R likewise can include, at 222, determining whether a selected original document segment 390O within the original electronic document 300O and a selected reference document segment 390R within the reference electronic document 300R include an amount of common textual content that is greater than a predetermined minimum threshold value (also called text hashing text).

The determination, at 222, of whether the document segments 390O, 390R include an amount of common textual content that is greater than the predetermined minimum threshold value can include a comparison of the words 350 (shown in FIG. 4A) in each original document segment 390O within the original electronic document 300O with the words 350 in each reference document segment 390R within the reference electronic document 300R. The comparison of the original and reference electronic documents 300O, 300R therefore can include identifying locations within the original and reference electronic documents 300O, 300R, wherein the text content 320 (shown in FIG. 4A) of the original and reference electronic documents 300O, 300R include the same, or similar, textual content. As desired, comparing, at 220, the original electronic document 300O with the reference electronic reference document 300R is illustrated in FIG. 6C as including, at 221, creating an index from the original document segments 390O within the original electronic document 300O to the reference document segments 390R in the reference electronic document 300R.

Figure 6D:
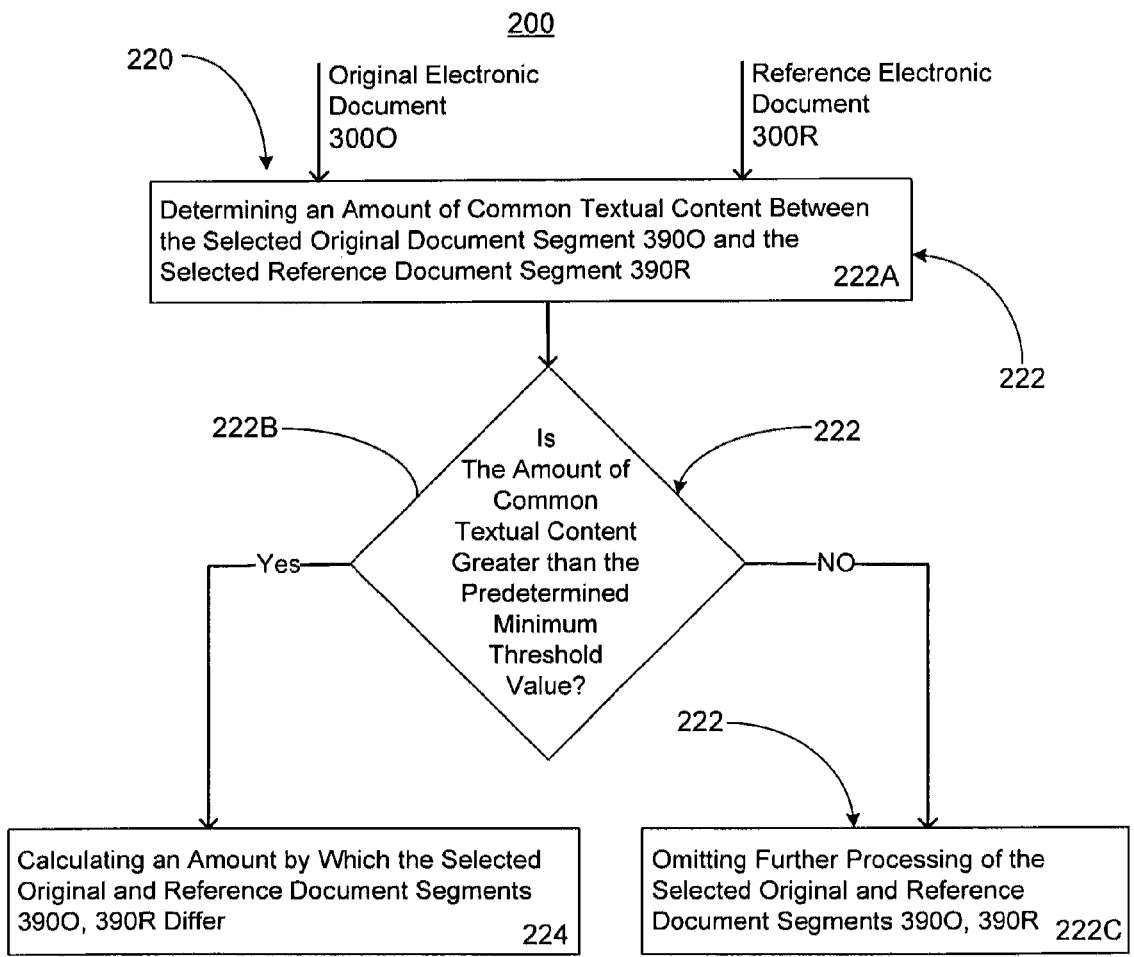
FIG. 6D is a flow chart illustrating another alternative embodiment of comparing the original electronic document with the reference electronic document of FIG. 6A, wherein further processing of the selected document segments within the original electronic document and the selected document segments within the reference electronic document is omitted when an amount of common textual content is less than a predetermined minimum threshold value.

FIG. 6D is a flow chart illustrating an alternative embodiment of comparing the original electronic document 300O with the reference electronic document 300R of FIG. 6A. As shown in FIG. 6D, the determination, at 222, of whether the document segments 390O, 390R include an amount of common textual content that is greater than the predetermined minimum threshold value can include, at 222A, determining an amount of comment textual content between the selected original document segment 390O and the selected reference document segment 390R. The amount of common text between the selected document segments 390O, 390R is identified by comparing the words 350 (shown in FIG. 4A) in each original document segment 390O with the words 350 in each reference document segment 390R.

The words 350 of the original and reference electronic documents 300O, 300R preferably are compared by performing a fast text hashing operation (or process) on the selected original and reference document segments 390O, 390R. The fast text hashing operation can determine whether the selected document segments 390O, 390R have more than N occurrences of at least K identical words 350, wherein N and K represent preselected positive integers and can be adjusted as desired. The document processing method 200 thereby can determine whether the selected original document segment 390O and the selected reference document segment 390R have minimum threshold level of common text.

The hash comparison can eliminate very different selected document segments 390O, 390R from the comparison 220. As shown in FIG. 6D, the amount of common textual content within the selected document segments 390O, 390R can be compared, at 222B, with the predetermined minimum threshold value. If the amount of common textual content is not greater than the predetermined minimum threshold value, the selected document segments 390O, 390R are deemed to be very different such that further processing of very different document segments 390O, 390R can be omitted, at 222C, to reduce document processing time. Thereby, the comparison of the original electronic document 300O and the reference electronic document 300R advantageously can focus upon the remaining original and reference document segments 390O, 300R, which are the most relevant to the comparison.

If the selected original and reference document segments 390O, 300R achieves (or is greater than) the minimum threshold level of common text, the document processing method 200 then, at 224, determines (or calculates) an amount by which the selected document segments 390O, 300R differ. This calculation, at 224, sometimes is referred to as a word level distance between the selected original document segment 390O and the selected reference document segment 390R. In other words, in a preferred approach, the document processing method 200 then determines an amount of work needed to transform the selected original document segment 390O within the original electronic document 300O into the selected reference document segment 390R within the reference electronic document 300R (and/or vice versa) for the remaining original and reference document segments 390O, 300R. The amount by which the selected document segments 390O, 300R differ can be determined in any conventional manner. An exemplary edit distance operation (or process) includes a Levenshtein-based N×N comparison technique in the manner set forth in Levenshtein, Vladimir, "Binary codes capable of correcting deletions, insertions, and reversals," Doklady Akademii Nauk SSSR, 163(4):845-848, (1965), with an English translation available in Soviet Physics Doklady, 10(8):707-710 (1966), the disclosure of which is hereby incorporated herein by reference in its entirety.

The edit distance operation (or process) is suitable for providing one measure of the amount by which the selected original and reference document segments 390O, 300R differ and provides the measure in terms of inserting, deleting, and replacing words 350. For every word 350 that is inserted, deleted, and/or replaced from one selected document segment 390O, 390R to the other selected document segment 390O, 390R, the edit distance operation assigns a word insertion cost, a word deletion cost, and a word replacement cost. Although a typical application assigns an equal cost for word insertion, word deletion, and word replacement, the word insertion cost, the word deletion cost, and/or the word replacement cost can comprise different costs, as desired.

Figure 6E:
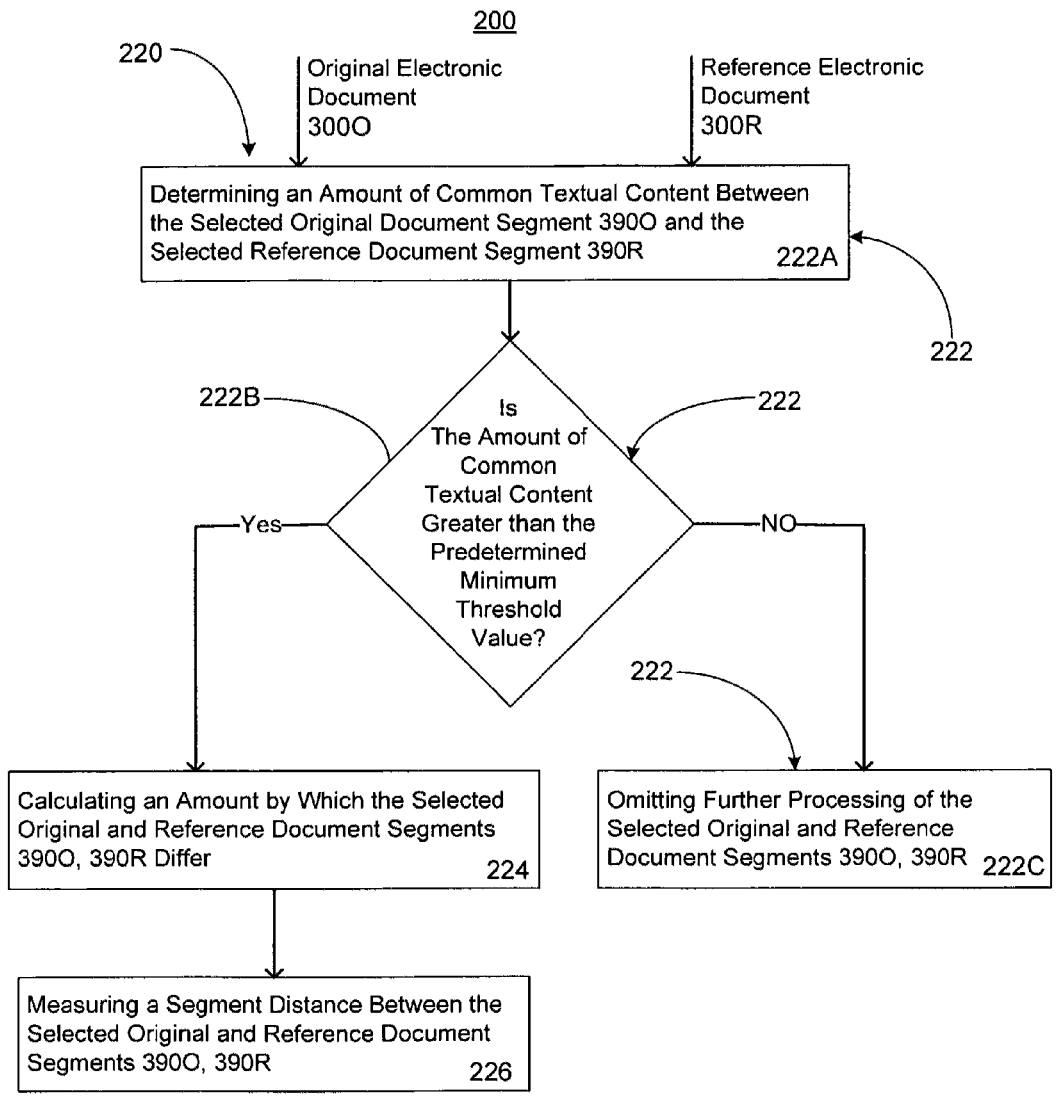
FIG. 6E is a flow chart illustrating an alternative embodiment of comparing the original electronic document with the reference electronic document of FIG. 6D, wherein a segment distance is measured between the selected document segment within the original electronic document and the selected document segment within the reference electronic document.

The edit distance operation can automatically compute a minimal total cost for the best match between the two selected document segments 390 using dynamic programming to search for changes. Thereby, the edit distance operation can find the smallest edit cost (or the best match) between the selected document segments 390, given a selected combination of values for the word insertion cost, the word deletion cost, and/or the word replacement cost. As illustrated in FIG. 6E, a segment distance between the selected original document segment 390O and the selected reference document segment 390R can be measured, at 226. The segment distance can be calculated in any conventional manner. For example, the segment distance can be calculated by dividing the edit distance of one of the selected document segment 390 by the number of words 350 (shown in FIG. 4A) in that selected document segment 390O, 390R. Although shown in FIG. 6E as being separate from the determination, at 224, of the amount by which the selected original and reference document segments 390O, 300R differ for purposes of illustration only, the measurement of the segment distance, at 226, can be at least partially incorporated into the determination, at 224, of the amount by which the selected document segments 390O, 300R differ, as desired.

Figure 7A:
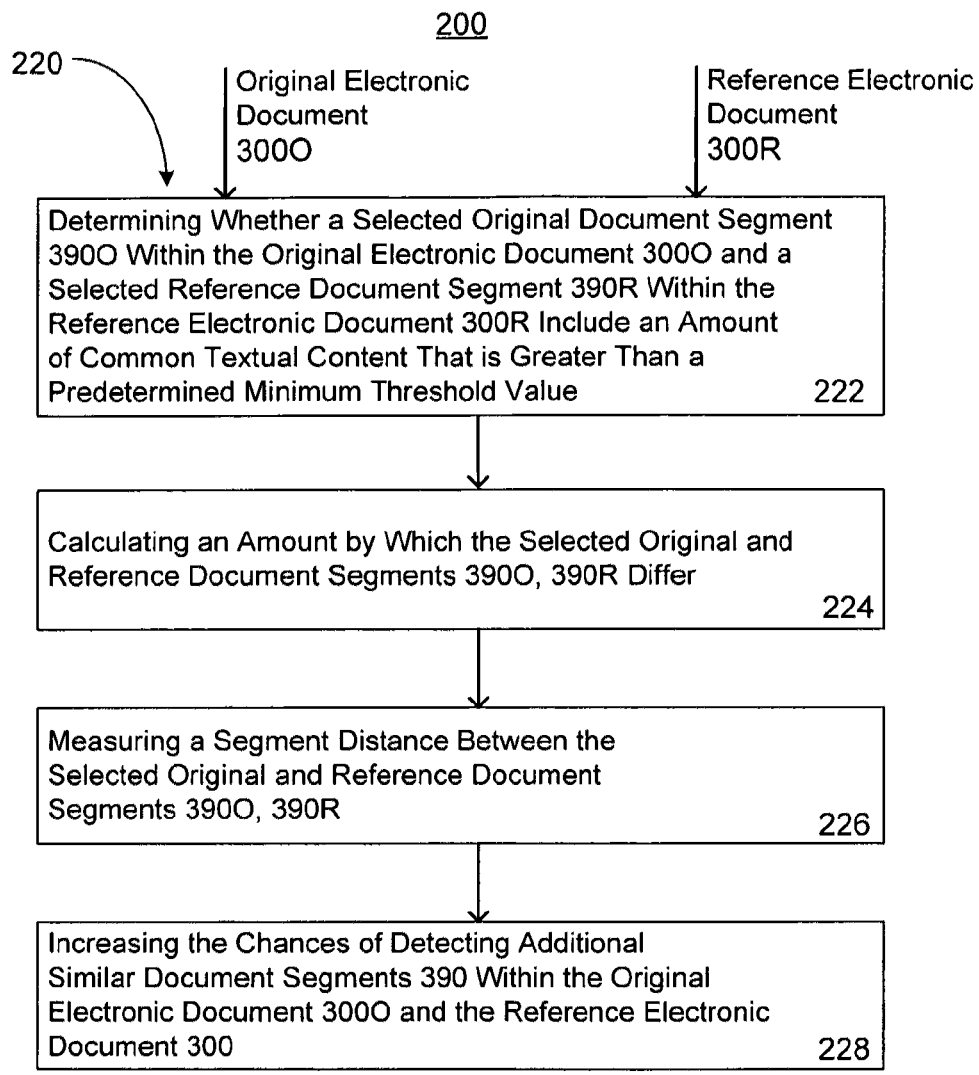
FIG. 7A is a flow chart illustrating another alternative embodiment of comparing the original electronic document with the reference electronic document of FIG. 6A, wherein the chance of detecting additional document segments within the original electronic document that are similar to the document segments within the reference document is increased.

Turning now to FIG. 7A, comparing the selected electronic document 300 with at least one electronic reference document 300R, at 220, is illustrated as further including, at 228, increasing the chance of detecting additional similar original and reference document segments 390O, 300R within the original electronic document 300O and the reference electronic document 300R. In other words, the source electronic document 300O can be searched for additional original document segments 390O that are similar to reference document segments 390R within the reference electronic document 300R. Further similarities between the original electronic document 300O and the reference electronic document 300R thereby are examined. Being mindful of the overall goal of detecting any similar original and reference document segments 390O, 300R, the similarities between the original and reference electronic documents 300O, 300R can be examined to determine whether the similarities are farther reaching than so far detected, including in a far away location and/or in more that one location.

Figure 7B:
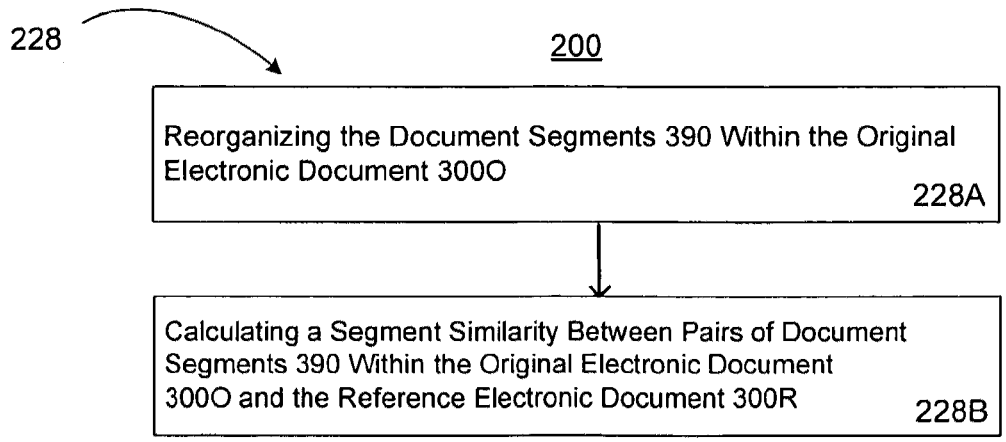
FIG. 7B is a flow chart illustrating an embodiment of the increasing the chances of detecting additional similar document segments of FIG. 7A, wherein a segment similarity is calculated between selected pairs of the document segments within the original and reference documents.
Figure 7C:
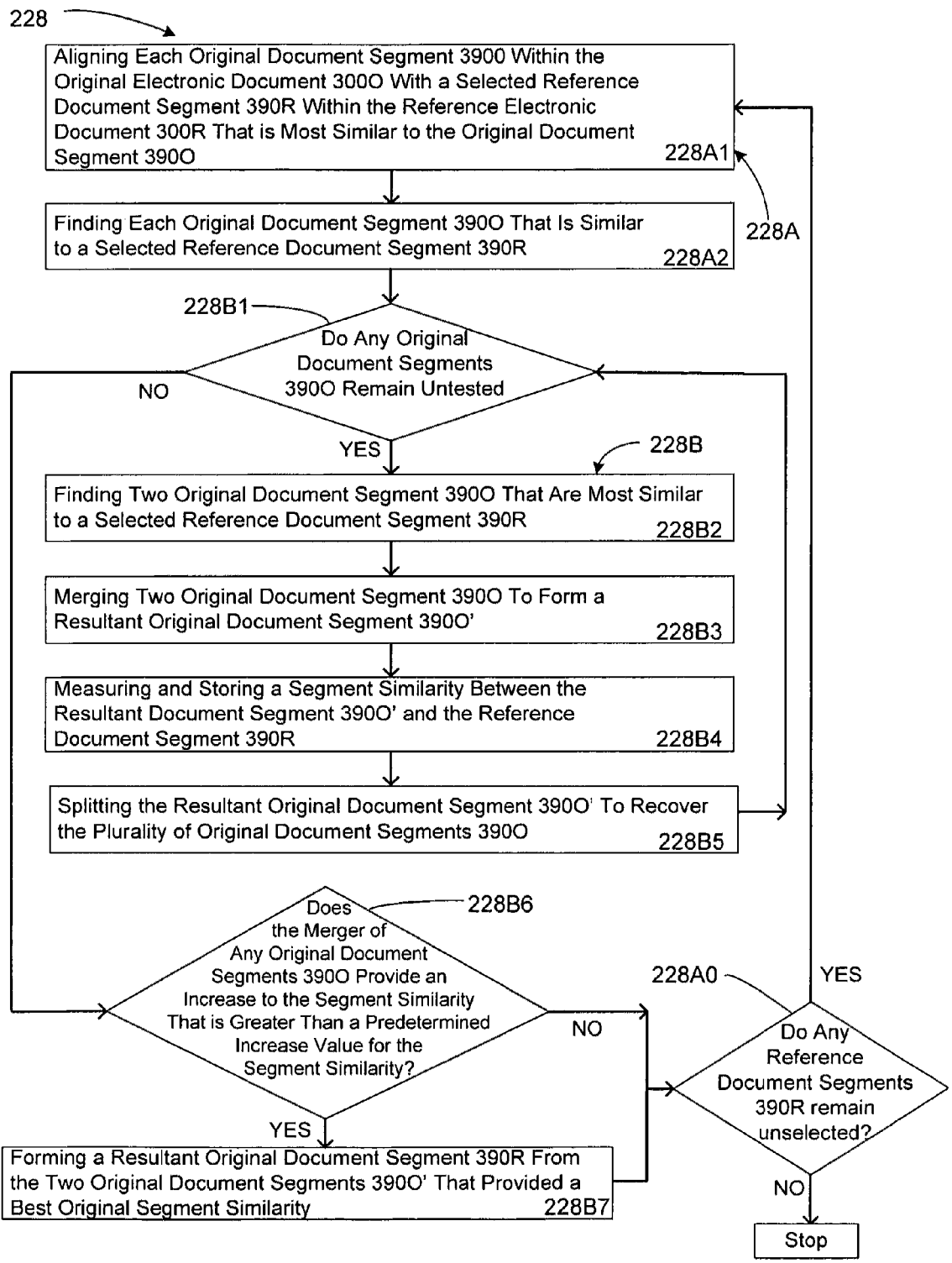
FIG. 7C is a flow chart illustrating an alternative embodiment of the increasing the chances of detecting additional similar original document segments and reference document segments of FIG. 7A, wherein one or more of the document segments within the original electronic document can be merged to increase the longest common subsequence.

Exemplary manners for increasing, at 228, the chances of detecting additional similar original and reference document segments 390O, 300R are illustrated in FIGS. 7B-C. As shown in FIG. 7B, the remaining document segments 390 can be reorganized, at 228A, to determine whether any similar text has been overlooked during the comparison of the remaining document segments 390, at 220. For example, each original document segment 390O within the original electronic document 300O can be aligned, at 228A1, with its most similar reference document segment 390R within the reference electronic document 300R as illustrated in FIG. 7C. The alignment of the original document segments 390O can be achieved by moving the original document segments 390O within the original electronic document 300O, by moving the reference document segments 390R within the reference electronic document 300R, or both. As desired, each original document segment 390O within the original electronic document 300O that is similar to a selected reference document segment 390R within the reference electronic document 300R can be identified, at 228A2.

The movement of the document segments 390O, 390R within the relevant electronic document 300O, 300R can comprise actual movement and/or virtual movement of the document segments 390O, 390R as desired. Thereby, the resultant original and reference electronic documents 300O, 300R can have substantially the same logical flow among the document segments 390. Any document segments 390O, 390R that appear in only one electronic document 300O, 300R, and have no counterpart in the other electronic document 300O, 300R, preferably are not moved. Stated somewhat differently, a selected document segment 390O, 390R in one electronic document 300O, 300R is not moved if the other electronic document 300O, 300R has no document segment 390O, 390R that surpasses a similarity threshold with respect to the selected document segment 390O, 390R.

FIG. 7B likewise shows that a segment similarity can be calculated, at 228, between selected pairs of the original document segments 390O and reference document segments 390R. Occasionally, segmentation of the electronic documents 300O, 300R can result in suboptimal classification of one or more of the document segments 390O, 390R, from the point of view of finding common text between the documents. If a document segment 390O, 390R is badly classified, the document processing method 200 can perform a search for the possibility of merging two or more document segments 390O, 390R into a single document segment 390O, 390R (and/or splitting a document segment 390O, 390R into two or more separate document segments 390O, 390R). Advantageously, the merged document segments 390 can originate in two different locations within the relevant electronic document 390O, 390R. The search criteria can use any similarity metric between the documents to guide the search for segments to merge. One preferred criteria can include increasing the longest common subsequence between pairs of document segments 390O, 390R and/or the inverse of the word level edit distance between the original and reference electronic documents 300O, 300R. The longest common subsequence is the longest sequence of words 350 (shown in FIG. 4A) that is a subsequence of both document segments 390O, 390R and can be found in polynomial time by a standard dynamic programming approach. Preferably, one or more of the word insertion cost, the word deletion cost, and/or the word replacement cost set forth above can be applied to narrow the search for good document segments 390O, 390R merges.

When determining the possibility of merging two or more document segments 390O, 390R into a single document segment 390 (shown in FIGS. 4B, 4D, 5B), the document processing method 200 can identify the document segments 390O, 390R that are potential candidates for being merged into the single document segment 390. The document processing method 200 identifies a word-level distance between the document segments 390O, 390R within the original and reference electronic documents 300O, 300R in the manner set forth above. Returning to FIG. 7C, the original electronic document 300O is examined, at 228B1, to determine whether any original document segments 390O within the original electronic document 300O remain untested.

If one or more original document segments 390O within the original electronic document 300O remain untested against the selected reference document segment 390R, the untested original document segments 390O are compared with the selected reference document segment 390R. The two (or more) untested original document segments 390O that are most similar to the selected reference document segment 390R are identified, at 228B2, and are merged, at 228B3, to form a resultant original document segments 390O'. Once the two untested original document segments 390O have been merged to form the resultant original document segments 390O', a new edit distance and a new segment distance can be calculated, at 228B4, based upon the original electronic document 300O with the resultant original document segment 390O'. The new edit distance, at 228B4, can be calculated in the manner set forth in more detail above with reference to determining the amount by which the selected document segments 390O, 300R differ, at 224 (shown in FIGS. 6B-C). Similarly, the new segment distance, at 228B4, can be calculated as discussed in more detail above with reference to measuring the segment distance between the selected original document segment 390O and the selected reference document segment 390R, at 226 (shown in FIG. 6E). The new edit distance and the new segment distance between the resultant original document segment 390O' and the associated reference document segment 390R thereafter can be stored, as desired.

After the new edit distance and the new segment distance have been stored, the resultant original document segment 390O' can be split (or divided), at 228B5, to restore the two original document segments 390O. The original electronic document 300O again is examined, at 228B1, to determine whether any additional original document segments 390O within the original electronic document 300O remain untested and, if so, two untested original document segments 390O can be identified and processed in the manner set forth above until each original document segment 390O has been tested. The document processing method 200 thereby merges each plurality of original document segments 390O that are potential candidates for being merged. Although shown and described with reference to merging two untested original document segments 390O within the original electronic document 300O for purposes of illustration only, two or more reference document segments 390R within the reference electronic document 300O likewise can be merged in the above manner. Accordingly, for each plurality of document segments 390O, 390R that are potential candidates for being merged, the document processing method 200 merges each plurality of document segments 390O, 390R to provide sets of merged document segments 390O, 390R in the manner set forth above.

If no original document segments 390O remain untested, the document processing method 200 determines, at 228B6, whether the merger of any of the two original document segments 390O provides an increase to the segment similarity that is greater than a predetermined increase value for the segment similarity. In other words, the document processing method 200 determines whether any of the resultant original document segments 390O' provides an increase to the segment similarity that is greater than the predetermined threshold increase value for the segment similarity. If none of the mergers of two original document segments 390O provides an increase to the segment similarity that is greater than the predetermined threshold increase value, the original document segments 390O within the original electronic document 300O again are aligned, at 228A1, with a different similar reference document segment 390R within the reference electronic document 300R and are further processed in the manner set forth above.

The processing method 200 of FIG. 7C likewise includes, at 228B7, forming a resultant original document segment 390O' from the two untested original document segments 390O that form the largest increase to the segment similarity if any of the resultant original document segments 390O provides an increase to the segment similarity that is greater than the predetermined increase value for the segment similarity. Once the resultant original document segment 390O' has been formed, the original document segments 390O within the original electronic document 300O again are aligned, at 228A1, with a different similar reference document segment 390R within the reference electronic document 300R and are further processed in the manner set forth above. This resultant segment (a segment that results from the merger of two segments), 390O' can now be considered to be a segment, just like any other segment 390O in the original document, once the algorithm progresses back to step 228A1. So maybe a way to reword this sentence: Once the resultant original document segment 390O' has been formed, it can be considered, at step 228A1 as an original segment 390O, and can be aligned with the most similar reference segment 390R. Thereafter, the document processing method 200 continues to identify and process the document segments 390O, 390R that are potential candidates for being merged in the manner set forth above until no merge results in an incremental improvement in the segment similarity that is greater than a predetermined minimum incremental increase value for the segment similarity.

Although shown and described with reference to merging original document segments 390O and to subsequent processing the resultant merged original document segments 390O' for purposes of illustration only, two or more reference document segments 390R within the reference electronic document 300R likewise can be merged to form resultant reference document segments (not shown) that are subsequently processed to improve the longest common subsequence in the manner set forth above with regard to the resultant original document segments 390O'. In other words, the original document segments 390O and/or the reference document segments 390R each can be merged and provide incremental improvements to the longest common subsequence in the above manner.

By processing the original and reference document segments 390O, 300R in the above manner, the document processing method 200 can generate similarity information between the original electronic document 300O and the reference electronic document 300R. The similarity information then can be used to present changes and similarities in the original and reference electronic documents 300O, 300R. The similarity information can be presented in any conventional or nonconventional manner. For example, the presented similarity information can include a set of matched, added, deleted, merged, and/or moved original document segments 390O from the original electronic document 300O to the reference electronic document 300R. Each document segment 390O, 390R likewise can include a set of added, deleted, and/or replaced words 350 (shown in FIGS. 3A-B).

The resulting document segments 390O, 390R can be used as the input to the comparison function. In the manner discussed in more detail above with reference to, at 222, determining whether the document segments 390O, 390R include an amount of common textual content that is greater than the predetermined minimum threshold, a matched document segment in one electronic document 300O, 300R is a document segment 390 that achieves the minimum common text with a document segment 390O, 390R in the other electronic document 300O, 300R. Similarly, an added document segment is a document segment 390 in the original electronic document 300O that does not achieve the minimum common text with a reference document segment 390R in the reference electronic document 300R; whereas, a deleted document segment is a reference document segment 390R in the reference electronic document 300R that does not achieve the minimum common text with an original document segment 390O in the original electronic document 300O. A merged segment is the set of merged document segments 390 that provides the greatest increase to the longest common subsequence as set forth above with reference to, at 228B7, performing a merge of the original and reference document segments 390O, 300R that provides the greatest increase to the longest common subsequence.

As desired, the document processing method 200 can in addition calculate a segment-level edit distance between the original electronic document 300O and the reference electronic document 300R. To calculate the segment-level edit distance, the document processing method 200 can apply the edit distance operation (or process) as discussed in more detail above, at 224, with reference to identifying the word-level distance between document segments 390O, 390R, but in this case using segments as the unit of comparison instead of words. In the manner set forth above, the edit distance process can compare the original document segments 390O in the original electronic document 300O to the reference document segments 390R in the reference electronic document 300R. Each document segment 390O, 390R thereby can be inserted, deleted, and/or replaced from one of the electronic documents 300O, 300R to the other electronic document 300O, 300R. The edit distance process thereby can find the smallest edit cost (or the best match) between the original and reference electronic documents 300O, 300R, given a selected combination of values for the segment insertion cost, the segment deletion cost, and/or the segment replacement cost.

Calculating segment-level edit distance between the original electronic document 300O and the reference electronic document 300R can include calculating word-level edit distance as a subroutine, or any other word-level similarity metric. In addition, segment-level edit distance can include detecting similar segment context. The similar segment context detection preferably includes a straight-forward comparison of words 350 within selected document segments 390O, 390R in the electronic documents 300O, 300R. If the words 350 within the selected document segments 390O, 390R are the same, for example, the context can be determined to be identical.

Detecting similar context in the segment-level edit distance calculation, however, can be more complex because document segments 390O, 390R rarely are completely identical. Advantageously, the document processing method 200 can determine whether a pair of selected document segments 390O, 390R are "close enough" matches to consider the selected document segments 390O, 390R to be identical. To determine whether the selected document segments 390O, 390R are sufficiently close to be considered identical, the document processing method 200 can apply a combination of the word-level edit distance cost and the longest common subsequence of the selected document segments 390O, 390R. If a combination of the word-level edit distance cost and the inverse of the longest common subsequence of the selected document segments 390O, 390R is less than a predetermined threshold cost, the selected document segments 390O, 390R can be determined to be identical; otherwise, the selected document segments 390O, 390R can be considered to not be identical.

The segment-level edit distance calculation can be used as an input to a document clustering approach and/or to assist in a document reviewer or other user in organizing his reading approach. In addition, and/or alternatively, the segment-level edit distance calculation likewise can be used as a heuristic to facilitate the determination regarding when to move document segments 390O, 390R within a selected electronic document 300O, 300R and/or when to re-segment (and/or merge) an electronic document 300O, 300R. For example, moving the document segments 390O, 390R within an electronic document 300O, 300R and/or re-segmenting the electronic document 300O, 300R can be performed if the resultant document 300O, 300R has a reduced segment-level edit distance.

The document processing method 200 likewise can enable a reviewer or other user to, upon request, view the similarities and/or differences between the original electronic document 300O and the reference electronic document 300R. As discussed in greater detail with regard to FIGS. 12B-12C and 13A-13E, upon receiving such a request, the document processing method 200 can present, for example, an image of one of the documents 300O, 300R, such as the reference electronic document 300R, with some of the presented words 350 emphasized and other presented words 350 de-emphasized. The emphasized words can include the words 350 found to have been added to and/or replaced within the reference electronic document 300R. Moved and merged document segments 390O, 390R likewise can be emphasized, as desired. Deleted document segments 390O, 390R and words 350 can be presented by reversing the direction of comparison. The deleted document segments 390O, 390R can be presented in any conventional manner, such as via striked-out text, text with vertical bars, and/or with a caret plus tool tip manner.

The position of the areas to emphasize and/or deemphasize can be determined via the imaging software that identifies an image position for each character on each document page 310 (shown in FIG. 4A). The document processing method 200 likewise can present selected statistics pertaining to the comparison of the electronic documents 300O, 300R. For example, the selected statistics can include an estimate of a percentage of similar text between the two electronic documents 300R, 300O. The percentage estimate could be the percentage of words 350 having any matching document segment 390O, 390R within one of the documents 300R, 300O. Similarly, the percentage estimate can include a percentage of document segments 390O, 390R that have good matches.

Figure 12A:
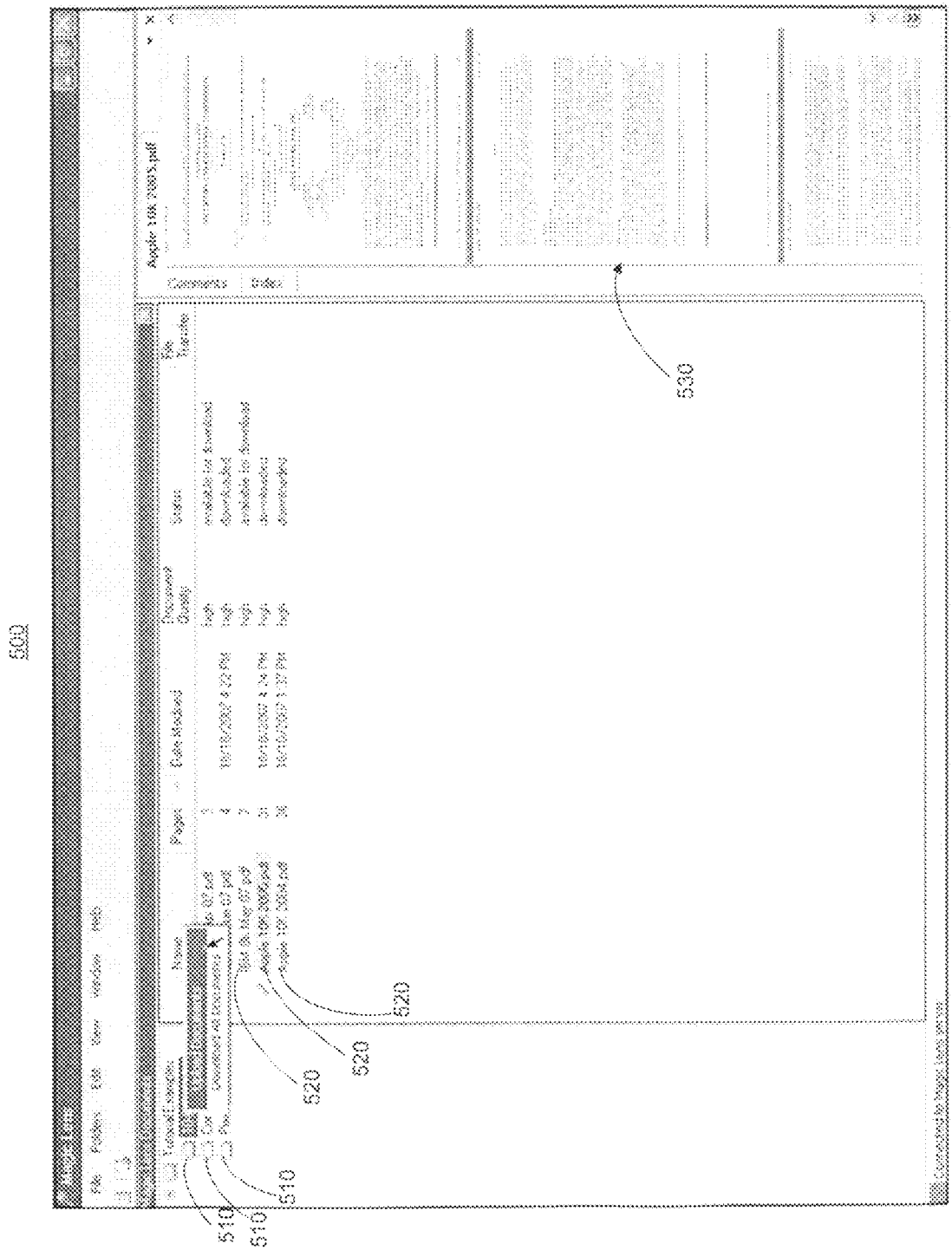
FIG. 12A is a detail drawing illustrating an exemplary embodiment of a software tool that facilitates organization of electronic documents.

From a workflow perspective, the comparison process can be applied to pairs of user-selectable electronic documents 300 (shown in FIG. 4A). The document processing method 200 preferably includes a software tool 500 (shown in FIG. 12A), such as a desktop tool, that facilitates organization of the electronic documents 300. As illustrated in FIG. 12A, the electronic documents 300 can be organized by folder (or directory) 510 for storing document files 520 for storing the electronic documents 300O, 300R, and pairs of electronic documents 300O, 300R within a selected folder 510 can be compared. The software tool 500 likewise supports automated search for matching text of user-selected document segments 390 (shown in FIG. 4A). As desired, the software tool 500 can enable an electronic document 300O, 300R associated with a selected document file 520 to be previewed. For example, the software tool 500 can include a preview window 530 for previewing the electronic document 300O, 300R. Given a pair-wise document comparison, the document processing method 200 can identify, for each words 350, phrases 360, sentences 370, and/or paragraphs 380 (collectively shown in FIG. 4A) in a selected original electronic document 300O, each occurrence of matching reference document segments 390R in the reference electronic document 300R.

For each word 350, phrase 360, sentence 370, and/or paragraph 380 in the selected original electronic document 300O, for example, the document processing method 200 can store a location of the words 350 (phrases 360, sentences 370, and/or paragraphs 380) and/or locations in the reference electronic document 300R of all matching text, as calculated by the word-level and segment-level edit distances discussed above. An index thereby can be built (as in step 221 of FIG. 6C) during the document comparison, which index can be referenced during a subsequent document review. For a selected document segment 390, the document processing method 200 likewise can locate each similar document segment 390 in all electronic documents 300 that are associated with the same folder. The document processing method 200 can apply the index to compute the similar document segments 390. For example, a user interface (shown in FIG. 12C) for the document processing method 200 can support selection of an area within an electronic document 300. If the user interface includes a pointing device, such as a mouse, the pointing device can be applied to select the area within the electronic document 300. Once the document area has been selected, the document processing method 200 can locate the electronic document within the folder that has a document segment 390 that is most similar to the selected area. The document processing method 200 likewise can search the reference electronic document 300R for the best matching document segment 390 when simultaneously presenting the original electronic document 300O and the reference electronic document 300R.

The word-level distance identifies words 350 as being equal if the words 350 comprise the same characters. Segment-level distance, in contrast, can provide a heuristic (or inexact) match as described above. As desired, word-level comparison can be extended to permit inexact word matches, such as conceptually equal words, words 350 that are equal after a stemming operation has been applied to the words, words 350 that, when converted into lower case, are the same, words 350 that can comprise proper nouns such as names, addresses or cities, and/or other user-selectable matching criteria. For example, conceptually equal words can be found via use of concept classifiers in the manner set forth in more detail below. Although shown and described above with reference to performing a text comparison between electronic documents 300, the document processing method 200 is not limited to text comparisons and can be readily applied to any conventional type of sequential or structural data. For example, the document processing method 200 can readily be applied to perform comparisons of two symbol sequences, such as deoxyribonucleic acid (DNA) sequences.

Advantageously, the document processing method 200 likewise can perform multi-dimensional comparisons on electronic documents 300. Electronic documents 100 often include embedded formatting commands that include segmentation information. For example, segmentation information can be embedded in section headings and/or table objects. The document processing method 200 can apply the segmentation information from the embedded formatting commands to the process for segmenting the selected electronic document 300, at 210 (shown in FIG. 2).

The process for segmenting and comparing the selected electronic document 300, at 210, likewise can apply to multi-dimensional tables (not shown) with a few extensions. Each table object in an electronic document 300 under comparison via the document processing method 200 preferably is treated as its own document and be compared to each table object in other electronic documents 300. Exemplary electronic documents 300 that can include table objects can include documents in conventional electronic formats such as Excel, Word tables, or PDF tables. Each column, row, or column/row embedded within another one is treated as a document segment 390 within the comparison operation (or process) as set forth above. In most cases, tabular data is not compared with text data, and any table (or row and/or column) document segment 390 thereby can be compared with any other table document segment 390. Thereby, the table document segments 390 can be split and/or rearranged in the manner set forth above with reference to text document segments 390. For example, the document processing method 200 can include identify similarities among the table documents even when the columns and/or the rows have been shifted. The capability of processing table document segments 390 illustrates the extended utility of the document comparison processes, at 220, of the document processing method 200.

Example 1

Exactly matching segments and/or documents 300O and 300R: In this example, the documents 300O and 300R each have three sections A, B and C that all differ by at least one word from each other. However, all text in the two documents is identical, so any choice of N and K would allow the documents to pass the text hashing test at step 222. The edit distances (step 224) between the sections are:

i. A<>A, B<>B, C<>C: zero ii. A<>B, A<>C, B<>C: greater than zero

At step 228A1, each segment is aligned with the segment in the same position in the other document. Merging any two segments (step 228B) would not increase (or decrease) the segment distance overall

Example 2

Same as Example 1 except with a few words different between the two documents 300O and 300R, and the sections of each of the two documents 300O and 300R are reversed as follows: A, B, C in 300O and C', B', A' in 300R. There are more words different between A and B or A and C than between A and A'.

At step 222, the majority of the words in the two documents 300O and 300R are determined to be the same, so most choices of N and K would allow the documents to pass the test. The edit distances between the sections of the documents 300O and 300R are:

i. A<>A', B<>B', C<>C': some small integer, N (N doesn't have to be the same for all three comparisons)

ii. A<>B', A<>C', B<>C': some integer larger than N

At step 228 each of the segments are aligned (step 228A1) in reverse order, so A is aligned with A' even though A is the first segment in 300O and A' is the last segment in 300R. Merging segments (step 228B) will likely not affect the segment distance overall.

Example 3

In this example, there are more significant differences between the documents 300O and 300R and there is also a split paragraph. The documents include the following paragraphs:

300O:

Paragraph A

Other examples of our technology leadership include telematics, stability control and other safety systems. Our in-vehicle security, communications and diagnostic system is the automotive industry's leading telematics provider, available on more than 50 vehicles. The third generation of our electronic stability control system debuted on the 2008. In addition to controlling brakes and reducing engine power, this latest iteration of the system combines active front steering to turn the front wheels into the skid when the rear wheels lose traction. Our Lane Departure Warning System and Side Blind Zone Alert System, which extend and enhance driver awareness and vision, also debuted in 2008.

Paragraph B

We generate and hold a significant number of patents in a number of countries in connection with the operation of our business. While none of these patents by itself is material to our business as a whole, these patents are very important to our operations and continued technological development. In addition, we hold a number of trademarks and service marks that are very important to our identity and recognition in the marketplace.

Paragraph C

By the end of fiscal 2006, the Company had opened a total of 165 retail stores, including 147 stores in the U.S. and a total of 18 stores in Canada, Japan, and the U.K. The Company opened 5 additional stores in October and November 2006. The Company has typically located its stores at high-traffic locations in quality shopping malls and urban shopping districts.

300R:

Paragraph C

By the end of fiscal 2006, the Company had opened a total of 165 retail stores, including 147 stores in the U.S. and a total of 18 stores in Canada, Japan, and the U.K. The Company opened 5 additional stores in October and November 2006. The Company has typically located its stores at high-traffic locations in quality shopping malls and urban shopping districts.

Paragraph B"

We hold many patents several countries. While none of these patents is material to our business as a whole, they are important to our operations and technological development. We also hold a number of trademarks and service marks that are important to our identity and marketplace recognition.

Paragraph A-2"

The next generation of our stability control system debuted in 2008. In addition to controlling brakes and reducing power, this iteration combines active front steering to turn the front wheels into the skid when the rear wheels lose traction. Our Lane Departure Warning System and Side Blind Zone Alert System, which enhance driver vision, also debuted in 2008.

Paragraph D

Paragraph A-1"

Our leadership include telematics, stability control and safety systems. Our in-vehicle security, communications and diagnostic system is the industry's leading telematics provider, available on more than 50 vehicles.

For many choices of N and K, the documents would pass the text hashing test at step 222. The edit distances (step 224) between the paragraphs of the documents 300O and 300R are as follows:

i. A<>A-2" and A<>A-1": about half the words are deleted and some other words are changed. Choose N2 and N1 to represent the edit distances
 ii. A<>C, A<>D: assume edit distance greater than N2 or N1.
 iii. A<>B": the two segments are almost completely different (a few words like "and", "of" "in" overlap, so edit distance would be close to the number of words in A, which is greater than N1 or N2
 iv. B<>B": some integer N
 v. B<>C, B<>D, B<>A-1", B<>A-2": some integer greater than N
 vi. C<>C: zero
 vii. C<>B", C<>A-2", C<>D, C<>A-1": greater than zero At step 228, A is aligned to A-2" since N2<N1. B is aligned with B", C is aligned with C. D and A-1" are unaligned (step 228A1). In step 228B2, A-1" and A-2" are both very similar to A, so are merged. If merged in the "correct" order, this would increase the LCS, and the segments would remain merged in further testing. No further merging would result in improved similarity.

Example 4

In this example, although there are paragraphs with one phrase that match there are but many other differences between the documents 300O and 300R. The documents include the following paragraphs:

Paragraph A:

We generate and hold a significant number of patents in a number of countries in connection with the operation of our business. While none of these patents by itself is material to our business as a whole, these patents are very important to our operations and continued technological development. In addition, we hold a number of trademarks and service marks that are very important to our identity and recognition in the marketplace.

Paragraph A':

Our leadership include telematics, stability control and safety systems. While none of these patents by itself is material to our business as a whole, the next generation of our stability control system debuted in 2008. In addition to controlling brakes and reducing power, this iteration combines active front steering to turn the front wheels into the skid when the rear wheels lose traction.

For some values of N and K, the segments would pass the text hashing test at step 222.

Example 5

In this example there are completely different original and reference documents 300O and 300R, assuming zero words in common between the two documents: for any choice of N and K the documents would not pass the text hashing test (step 222).

Improving Recognition Accuracy

Figures 8A, 8B:
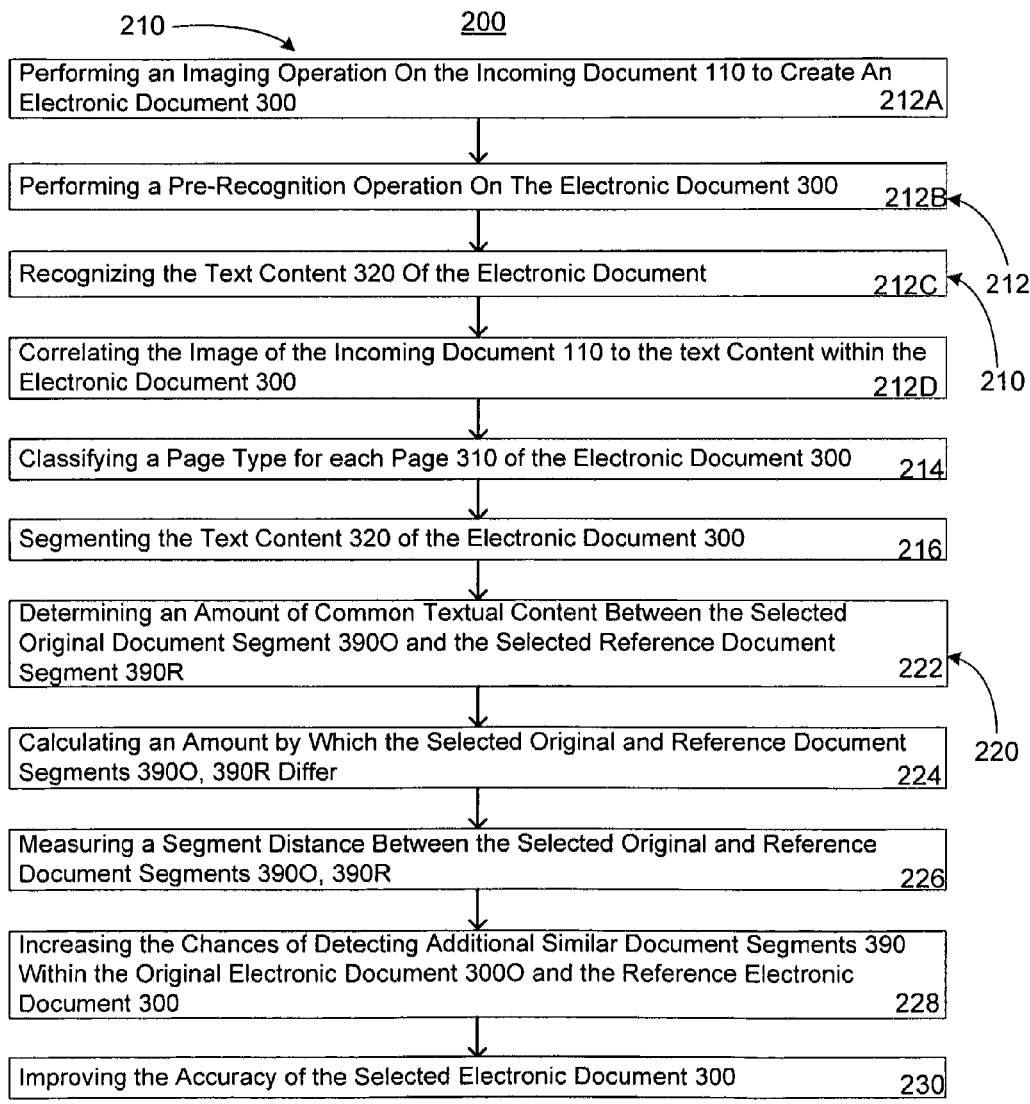
FIG. 8A is a top-level flow chart illustrating an alternative embodiment of the document processing method of FIG. 2, wherein the document processing method of FIG. 2 further includes a process for improving the recognition accuracy of the selected electronic document.
FIG. 8B is a chart illustrating an alternative embodiment of the document processing method of FIG. 8A, wherein the document processing method of FIG. 2 comprises segmenting the electronic document in accordance with FIG. 3B and comparing the original electronic document with the reference electronic document in accordance with FIG. 7A.

Turning to FIG. 8A, the document processing method 200 is shown as including, at 230, a process for improving the accuracy of document recognition processes. For example, conventional OCR engines, while often using reference document repositories to improve recognition results, do not typically "adapt" as they encounter new types of documents. Accordingly, currently-available recognition techniques can be improved by using the results of the comparison process described above as input to an improved recognition repository. In addition, this approach can compare the possible recognitions of words 350, phrases 360, sentences 370, and/or paragraphs 380 (collectively shown in FIG. 4A) with at least one set (or reference library) comprising previously-encountered, highly confident, and/or standard words 350, phrases 360, sentences 370, and/or paragraphs 380. Such a comparison can improve the accuracy of the text recognized by the document processing method 200.

The process of improving of document recognition accuracy, at 230, can be applied to the document processing method 200 during examination of the similarities between the original electronic document 300O and the reference electronic document 300R, at 228 (shown in FIG. 7A). In particular, the process of improving of document recognition accuracy, at 230, preferably is applied during or after the search for the possibility of merging two or more document segments 390 (shown in FIGS. 4B, 5B) into a single document segment 390 (and/or splitting a document segment 390 into two or more separate document segments 390) to increase the longest common subsequence between pairs of document segments 390 in the two electronic documents 300O, 300R (shown in FIG. 6C) in the manner set forth above.

Thereby, the process of improving of document imaging accuracy, at 230, can identify and repair errors in the words 350 as recognized by the conventional recognition processes. The process of improving of document recognition accuracy, at 230, advantageously can make use of the presence of highly-matching document segments 390. For example, the process of improving of document recognition accuracy, at 230, can receive as input two document segments 390 that are, at least within a predetermined threshold, similar to each other. The process of improving of document recognition accuracy, at 230, can examine the words 350 that are replaced and/or inserted in one of the document segments 390 when compared to the other document segment 390.

As shown in FIG. 8B, the improvement, at 230, of the selected electronic document 300 can be applied in conjunction with the increase, at 228, in the chances of detecting additional similar original and reference document segments 390O, 300R within the original electronic document 300O and the reference electronic document 300R. The improvement, at 230, of the selected electronic document 300 thereby can be used to correct errors in the words 350 (shown in FIG. 4A) recognized via the currently-available imaging techniques. For example, the accuracy of the selected electronic document 300 can be improved by reducing recognition errors, such as OCR errors, in the selected electronic document 300. Recognition errors can be reduced, according to one embodiment, by comparing images of individual words 350 that were identified as being different words during the initial recognition of the associated incoming document 110 (shown in FIG. 1) and that are embedded in matching text within the remaining document segments 390 (shown in FIG. 4A). Thereby, the document processing method 200 can take advantage of the presence the text content 320 within highly matching document segments 390 to improve the accuracy of the selected electronic document 300. In another embodiment, the document processing method 200 can take advantage of user-provided images of recognized words to improve the accuracy of the selected electronic document 300 as well as use the user-provided images of recognized words to train a classifier that is combined with the other image comparison techniques described herein.

Figure 9A:
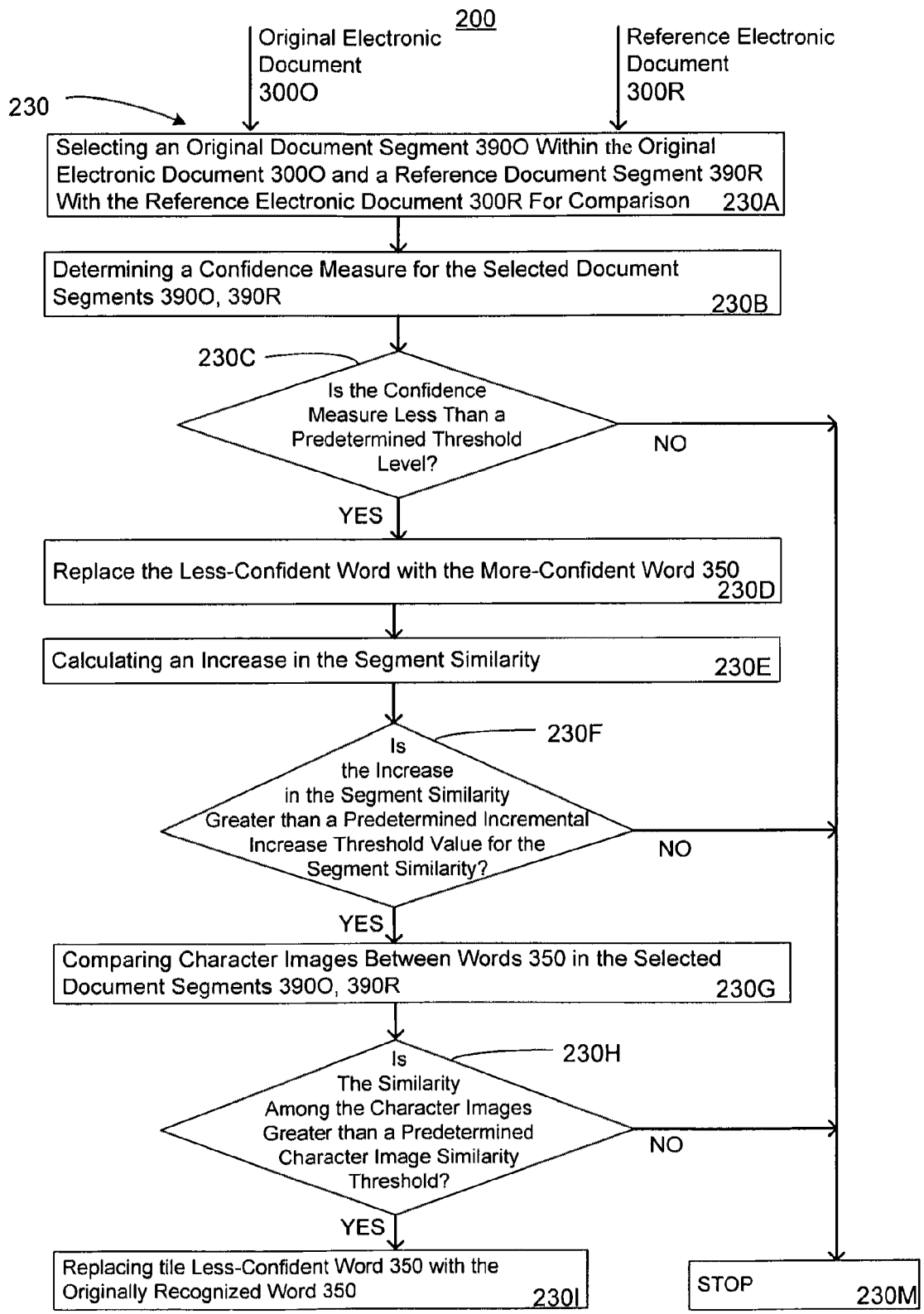
FIG. 9A is a flow chart illustrating an embodiment of the process for improving the recognition accuracy of the selected electronic document in accordance with the document processing method of FIG. 8A, wherein images of characters between words within a pair of electronic documents are compared.

Turning to FIG. 9A, the document processing method 200 is shown as considering the original electronic document 300O and the reference electronic document 300R in the manner set forth above. The improvement, at 230, of the selected electronic document 300 can select, at 230A, an original document segment 390O within the original electronic document 300O and a reference document segment 390R within the reference electronic document 300R. The original document segment 390O preferably is similar to the reference document segment 390R within a predetermined threshold value. The document processing method 200 then can examine the words 350 that have been replaced and/or inserted in the original document segment 390O during the comparison with the reference document segment 390R, and determines whether to apply the improvement to a particular word 350 in the original document segment 390O, or in the reference document segment 390R, depending on which word has the lower confidence in recognition result, thereby changing the text content 320 recognized by the combined process.

The document processing method 200, at 230B, determines a confidence measure for the selected document segments 390O, 390R. Recognition improvement preferably is attempted for the less confident recognition result of the selected document segments 390O, 390R, or for the less confident recognition result of an individual word 350 in the document(s). The confidence measure is the average confidence rate on the character recognition provided by the document imaging system when the original and reference electronic documents 300O, 300R are recognized, at 212 (shown in FIGS. 3A-B). Incoming documents 110 (shown in FIG. 1) that are received in an electronic form, such as electronic documents produced via processing applications, have the highest confidence rate because such incoming documents 110 do not require recognition. In other words, incoming documents 110 that are received in an electronic form are not imaged, and no text recognition improvement needs to be applied to such documents.

The confidence measure for at least one of the selected document segments 390O, 390R is shown as being compared with a predetermined threshold level, at 230C. If the confidence measure for at least one of the selected document segments 390O, 390R is greater than a predetermined threshold level, the improved accuracy process stops, at 230M. Otherwise, a potential increase in the segment similarity is calculated, at 230E, for the selected document segments 390O, 390R, if a change in recognition result were to be made. The segment similarity increase preferably is calculated to measure the effect that the recognition improvement would have on the comparison, at 220 (shown in FIG. 8B), of the original electronic document 300O and the reference electronic document 300R. Stated somewhat differently, the word 350 with the lower confidence measure can be temporarily replaced by the word 350 with the higher confidence measure, at 230D, and the resultant effect of the temporary replacement on the segment similarity is calculated. At 230F, the increase in the segment similarity is compared with a predetermined incremental increase threshold value for the segment similarity. If the increase in the segment similarity is not greater than the predetermined incremental increase threshold value, the improved accuracy process stops, at 230M. Otherwise, the character images of the words 350 in the selected document segments 390O, 390R can be compared, at 230G, if the increase in the segment similarity is less than the predetermined incremental increase threshold value.

The comparison, at 230G, between the character images of the words 350 in the selected document segments 390O, 390R can be performed in any conventional manner. For example, the character images between the words 350 in the selected document segments 390O, 390R can be compared via a tangent distance in the manner disclosed by Simard et al., "Efficient Pattern Recognition Using a New Transformation Distance," Advances in Neural Information Processing Systems, No. 5, pp. 50-58, Morgan Kaufmann (1993), the disclosure of which is hereby incorporated herein by reference in its entirety. Tangent distance is a mathematical approach to measuring distances between images that attempts to be invariant with respect to small changes such as scaling, translation, rotation, and/or axis deformation. The tangent distance between two patterns can be defined as the minimum distance between their respective manifolds, as defined by parameters such as scaling angle.

The similarity among the character images then can be compared with a predetermined character image similarity threshold, at 230H. If the similarity among the character images is not greater than the predetermined character image similarity threshold, the improved accuracy process stops, at 230M. Otherwise, the less-confident word 350 is replaced with the originally-recognized word 350, at 230I, if the similarity among the character images is greater than the predetermined character image similarity threshold.

Figure 9B:
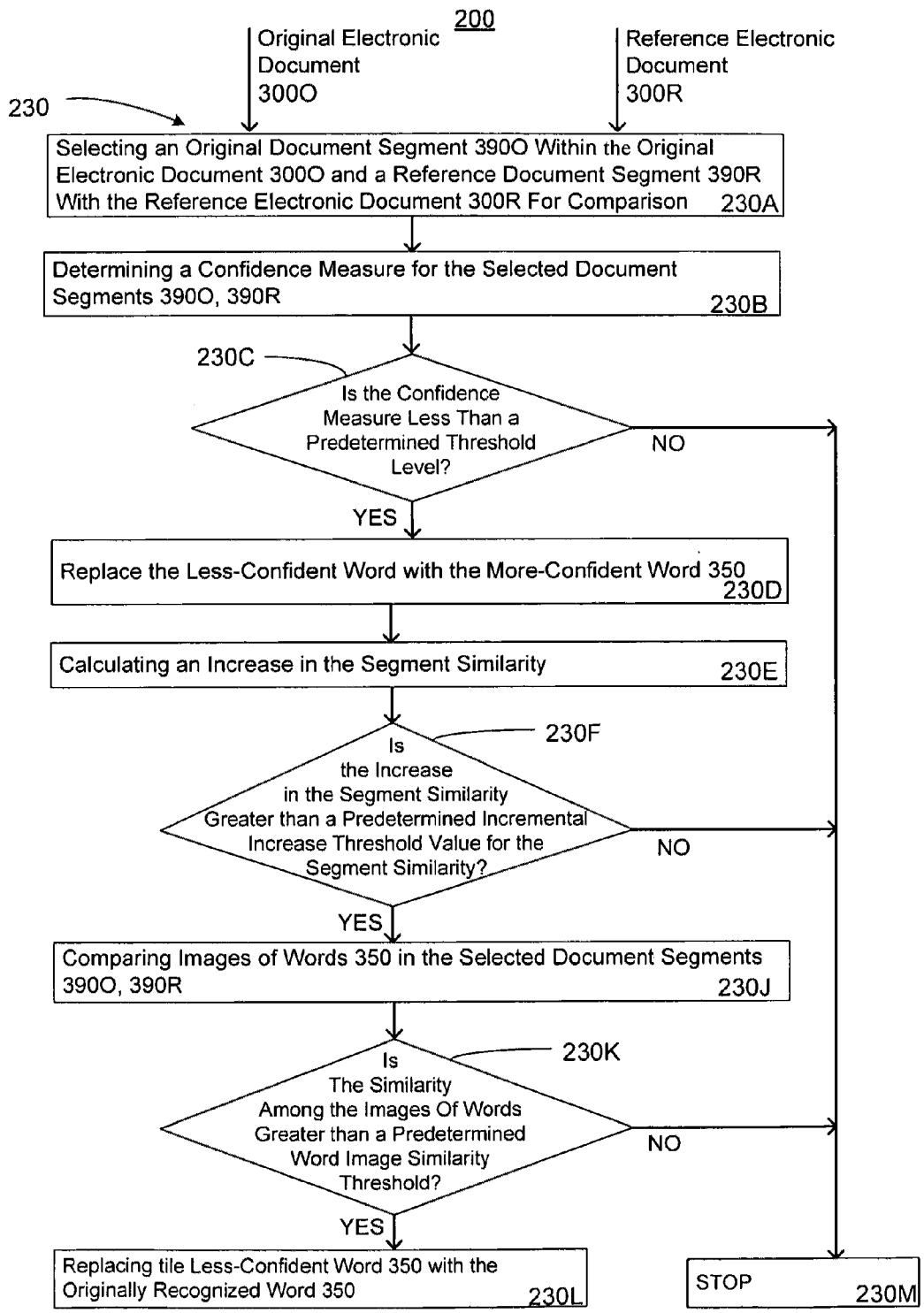
FIG. 9B is a flow chart illustrating an alternative embodiment of the process for improving the recognition accuracy of the selected electronic document of FIG. 9A, wherein images of words in the pair of electronic document are compared.

In addition and/or alternatively, the images of selected entire words 350 in the document segments 390O, 390R can be compared, at 230J, as illustrated in FIG. 9B if the increase in the similarity is greater than a predetermined incremental increase threshold value, at 230F. The comparison, at 230J, of the images of the selected words 350 in the document segments 390O, 390R likewise can be performed in any conventional manner and in one embodiment is performed via a tangent distance calculation in the manner set forth above. Since the tangent distance can be sensitive to global changes versus local changes, the tangent distance calculation preferably is performed in an alternative embodiment as a series of discrete processes. The similarity among the images of selected entire words 350 then can be compared with a predetermined word image similarity threshold, at 230K. If the similarity among the images of selected entire words 350 is not greater than the predetermined word image similarity threshold, the improved accuracy process stops, at 230M. Otherwise, the less-confident word 350 is replaced with the originally-recognized word 350, at 230L, if the similarity among the character images is greater than the predetermined word image similarity threshold.

Figure 9C:
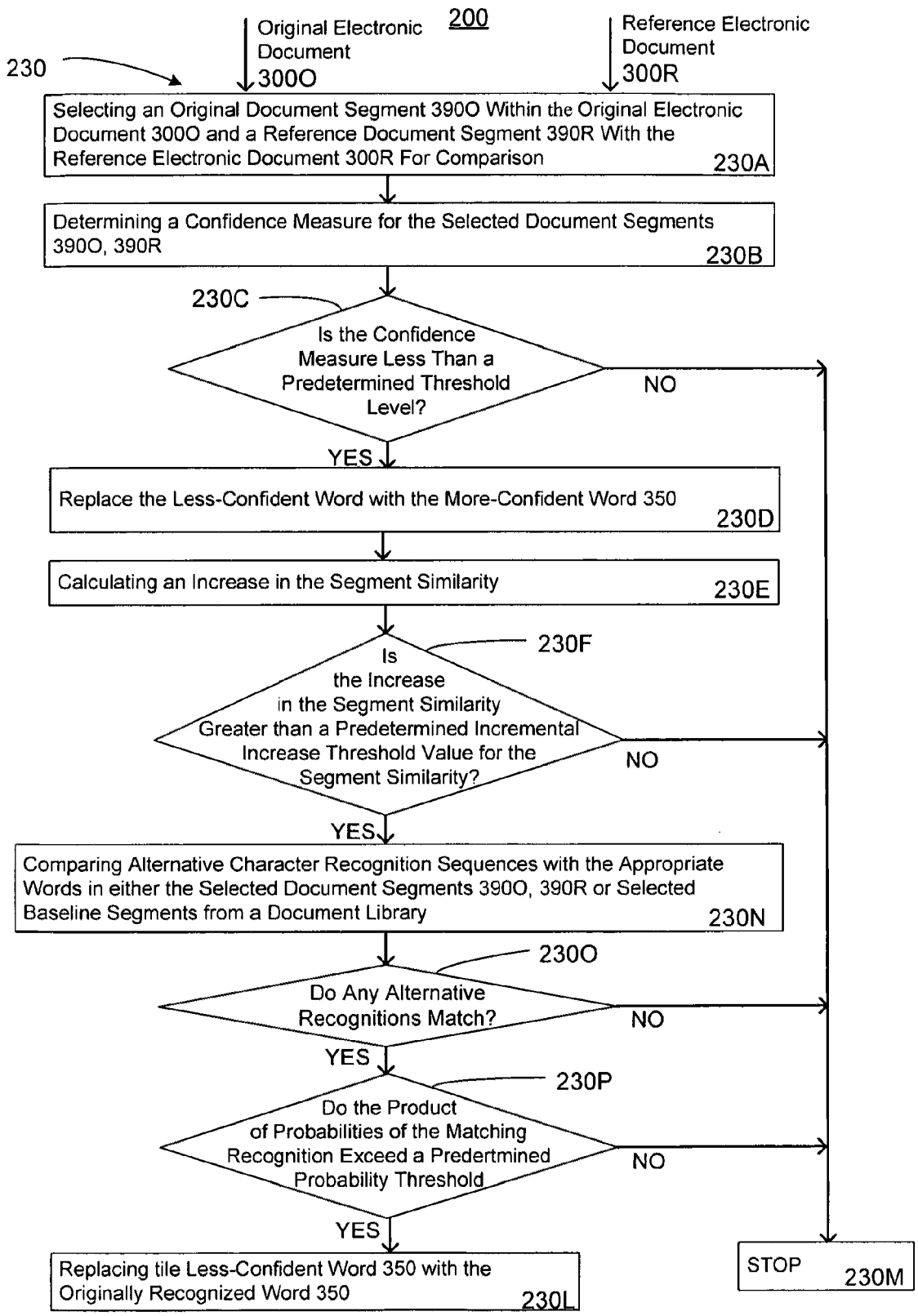
FIG. 9C is a flow chart illustrating another alternative embodiment of the process for improving the recognition accuracy of the selected electronic document of FIG. 9A.

Another alternative to improve the recognitions of the words to the character image comparison method includes the user or system adding new words in the known text to the OCR recognition dictionary and/or considering multiple recognition candidates based on similar documents. OCR engines typically return multiple recognition candidates for a word or segment. Instead of only keeping the best, the process temporarily stores all recognitions and runs the comparison as noted above for segments with high similarity to reference segments. As illustrated in FIG. 9C, the process, at step 230N, identifies words with either low OCR confidence or words that differ between the two segments, and goes back to the recognition candidates stored as noted above to test whether alternative recognitions match the word in the known segment or higher-confidence recognized words. If a match is found at step 230O, a correction is applied by replacing at step 230L the identified words with their alternative based on matching text. Optionally, the process would include a step, step 230P, to evaluate the product of the probabilities given by the OCR algorithm for a match, and only apply the correction if it exceeds a threshold.

For example, the words "see", "sea", and "pea" are all assumed to be in the OCR dictionary. The OCR is decoding a piece of paper which says "I see the shore". This is determined at step 230O to match a known text phrase from a reference document or library. Next, with regard to the second word "see", the OCR process returns a 45% chance a given word is "sea"—but a 35% chance that the word is "see" and a 20% chance that the word is "pea". For convenience of exposition, the OCR process is assumed to have given a 100% score to the words "I", "the", and "shore". Next, OCR process notices that the phrase with the highest word-by-word OCR probability, "I sea the shore", is not in the known text store (or reference document), but, that "I see the shore" is. The OCR process then computes at step 230P the word-by-word probability product of 100%×35%×100%×100%=35% and concludes that this is a high enough probability that the text being OCR processed really was "I see the shore" and therefore so recognizes it as such.

Existing OCR systems attempt to minimize recognition errors by comparing the results against dictionaries of words in the language of the document, or by applying grammar rules, or other language-based heuristics. The OCR software adjusts and can pick lower probability characters if that will help create a word known to be in the dictionary or better fit grammar or heuristics. However, in an application where the OCR is being used to compare paper against known text (for example in electronic documents), the method can just described can perform more effectively.

Figure 9D:
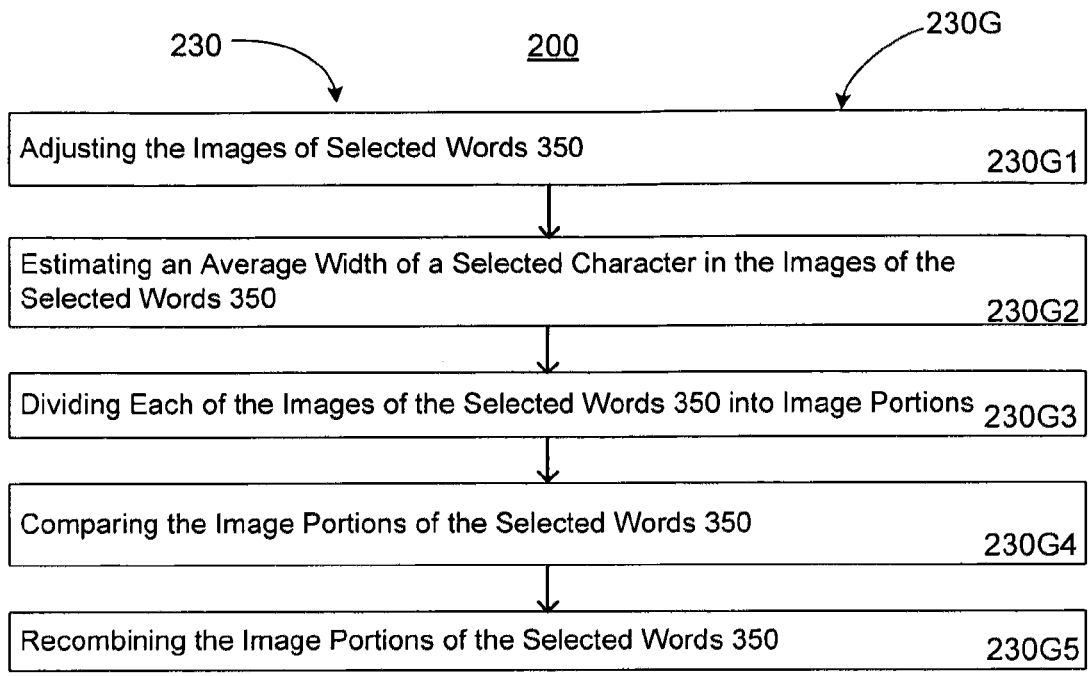
FIG. 9D is a flow chart illustrating an embodiment of an exemplary process for comparing the images of words in the pair of electronic documents of FIG. 9B.

An exemplary process 230G for comparing the images of the selected words 350 in the document segments 390O, 390R in accordance with the tangent distance calculation is shown in FIG. 9C. The goal of this process is to more accurately compare images at the character level rather than at the word level, even when errors in OCR character-segmentation are present. Turning to FIG. 9D, the exemplary process 230G for comparing the images of the selected words 350 in the document segments 390O, 390R is shown as including, at 230G1, adjusting the images of the selected words 350. The adjustment of the images of the selected words 350 can include scaling and/or distorting the images of the selected words 350. The images of the selected words 350 thereby can be adjusted such that the images of the selected words 350 are approximately the same size. The exemplary process 230G likewise can include, at 230G2, estimating an average width of at least one selected character in the images of the selected words 350. The images of the selected words 350 can be divided, at 230G3, into one or more image portions (not shown). Preferably, each of the one or more image portions comprises approximately one character of the selected words 350.

At 230G4, the exemplary process 230G for comparing the images of the selected words 350 includes comparing the image portions of the selected words 350. The image portions of the selected words 350 can be compared in any conventional manner, preferably via the tangent distance calculation set forth above, resulting in a distance measure. For example, each aligned image portion of the selected words 350 can be compared in one or more preselected directions across the page 310 (shown in FIG. 4A). The image portion of the selected words 350 can be compared from a left edge region of the page 310 to a right edge region of the page 310, from the right edge region to the left edge region of the page 310, and/or from a central region of the page 310 to the right edge region and/or the left edge region of the page 310. If the comparison, at 230G4, includes the tangent distance calculation, combining the distance measures of the individual image portions of the selected words 350 can include normalizing the tangent distance calculations of the image portions of the selected words 350. The image portion of the selected words 350 are recombined, at 230G5.

Returning to FIG. 9B, the comparison, at 230G, of the images of selected words 350 in the document segments 390O, 390R can include a calculation of a partial Hausdorff distance in the manner set forth in Huttenlocker et al., "Comparing Images Using the Hausdorff Distance," IEEE Transactions on Pattern Analysis and Machine Intelligence, Vol. 15, No. 9 (September 1993), the disclosure of which is hereby incorporated herein by reference in its entirety. The irrelevant pixels can be excluded by drawing a bounding box (not shown) close to a boundary around each selected word 350 and excluding the pixels outside the boundary from the distance comparison.

The document processing method 200 can normalize and sum a combination of one or more of the calculations set forth above with reference to improving the accuracy of document recognition processes, at 230, to determine whether any recognition improvement should be made between the document segments 390O, 390R. In other words, the above calculations can be scaled to conform to the same range so that they have equal influence on the input function used to decide whether to apply recognition improvement. To determine whether any recognition improvement should be made between the document segments 390O, 390R, the document processing method 200 can apply, for example, a minimum incremental increase threshold in the manner set forth above with reference to predetermined minimum incremental increase value for the longest common subsequence or other similarity metric as discussed above with reference to FIG. 7C.

The recognition improvement can be performed by replacing one or more words 350 in the less confident document segment 390O, 390R by the very similar (according to the metrics discussed above or their combination) word 350 in the more confident document segment 390O, 390R. A plurality of threshold levels, such as the predetermined threshold level, at 230C, the predetermined incremental increase threshold value, at 230E, and the minimum incremental increase threshold, are used during the recognition improvement process. To decide whether to replace the recognized word 350, the document processing method 200 can employ these threshold levels can be used in conjunction with the bounding box set forth above with reference to the comparison, at 230G, of the images of selected words 350 in the document segments 390O, 390R. These threshold levels and/or the bounding box can be tuned to minimize the false positive rate.

Concept Classification and Searching

Figure 10:
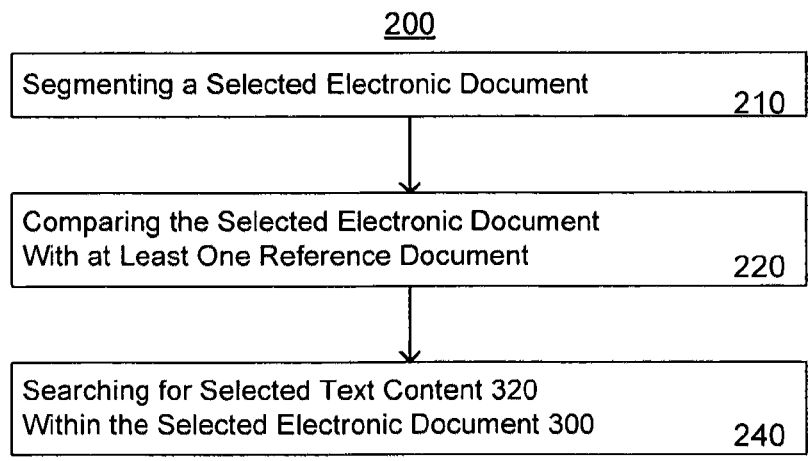
FIG. 10 is a top-level flow chart illustrating another alternative embodiment of the document processing method of FIG. 2, wherein the document processing method of FIG. 2 further includes searching for selected text content within the electronic document.

As illustrated in FIG. 10, the document processing method 200 can enable the reviewer or other user to search for selected (or user chosen) text content 320 within an electronic document 300 and/or to provide one or more summary views of the electronic document 300. The search for the selected text content 320 within the electronic document 300 can include conventional plain-text searching that can be supported from the recognition process, at 212 (shown in FIGS. 3A-B) of the incoming documents 110 (shown in FIG. 1) and/or the improved accuracy process, at 230 (shown in FIG. 8A), of document recognition processes.

Since some text content 320 has alternative phrasing (or wording) in different documents, the document processing method 200 advantageously can include concept searching for the selected text content 320 within the electronic document 300. Concept searching enables the electronic document 300 to be searched for text content 320 belonging to a predetermined (or ad hoc) concept category. Once a concept category has been selected during a concept search, the document processing method 200 can identify and emphasize each document segment 390 (shown in FIGS. 4B, 4D, 5B) within the electronic document 300 that matches the concept category. In other words, each document segment 390 within the electronic document 300 can be associated with one or more relevant concept categories.

One or more concept classifiers can be applied to determine whether a selected document segment 390 is associated with a particular concept category. The concept classifiers are classifiers, such as binary classifiers and/or multi-class classifiers, for identifying concepts and can be provided in the manner set forth in more detail above with reference to segmenting the selected electronic document 300, at 210 (shown in FIGS. 3A-B). Although the concept classifiers can comprise hand-built classifiers, the concept classifiers preferably are learned from examples provided by domain experts. In other words, the concept classifiers preferably are associated with the concept classes that are of most interest to reviewers and other users and therefore are chosen in consultation with domain experts. Thereby, a suitable set of concept classifiers can be identified and/or trained for application to any document segment 390 within the electronic document 300.

Figure 11:
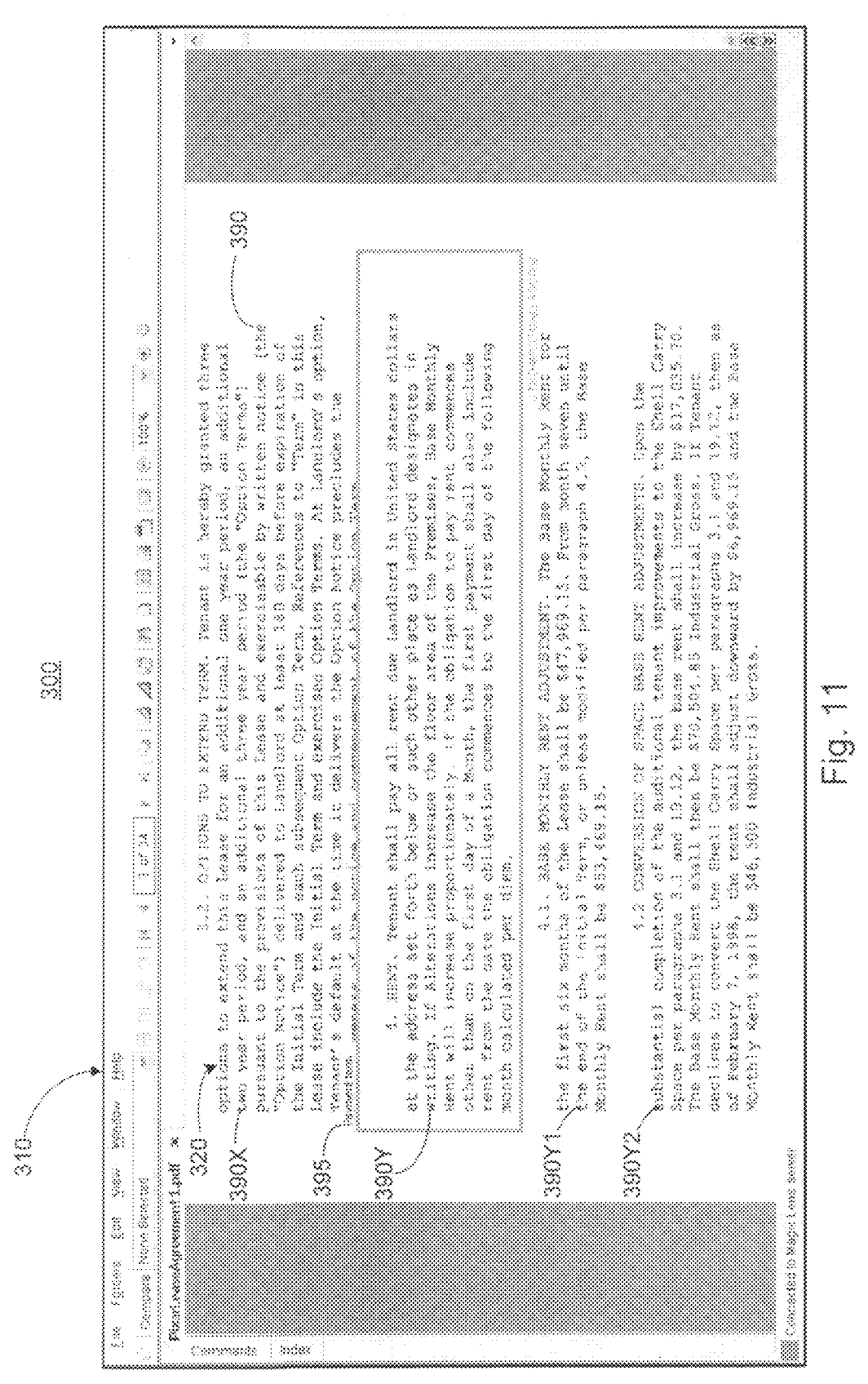

Turning to FIG. 11, an image of a selected page 310 of an exemplary electronic document 300 upon which concept classification has been performed is shown. In the manner discussed in more details above with reference to FIGS. 4A-B and 5A-B, the electronic document 300 includes content derived from the associated incoming document 110 (shown in FIG. 1) and is provided in an electronic form. Each document page 310 can include text content 320 that has been divided into a plurality of document segments 390X, 390Y, 390Z. As illustrated in FIG. 11, the document segment 390Y has been associated with a "Payment Terms" concept as indicated by a label 395. Thereby, if a concept search is performed for the "Payment Terms" concept, the document segment 390Y within the electronic document 300 will be identified.

Once the set of concept classifications has been identified, training data can be created for the concept classifiers. In one embodiment, the reviewer or other user can create the training data for the concept classifiers. The reviewer thereby can select a portion, such as a document segment 390, of the image of a selected electronic document 300 and associate (or label) the selected document segment 390 with an appropriate concept from a predetermined list of concepts. After a particular concept has been associated with a sufficient number of document segments 390 in this manner, a concept classifier can be trained to propose additional document segments 390 as being associated with the concept. The additional document segments 390 can be provided within the selected electronic document 300 and/or within other electronic documents 300, as desired. Training of the concept classifier can include positive training examples and/or negative training examples. For example, a positive training example for a selected concept classifier can include the document segments 390 that have been labeled with the concept related to the selected concept classifier; whereas, negative training examples for the selected concept classifier can include the document segments 390 that have been labeled with different concept classifiers.

In the manner discussed in more detail above with reference to segmenting the electronic document 300, at 210 (shown in FIG. 2), the concept classifiers likewise can include one or more features. A combination of text features and/or image-based features from the labeled sections can be applied for the concept classifiers, as exemplified in Tables 1 and 2 above. Word features, for example, can leverage recognizing the electronic document 300, at 212 (shown in FIG. 3A) and/or improving the accuracy of the selected electronic document 300, at 230 (shown in FIG. 8A) for document match. Feature selection approaches can optionally be included. In addition and/or alternatively as desired, the experts likewise can provide one or more tips about what features might be useful for a given concept. For example, some features, such as a "number" features, might be more useful for some concepts than for other concepts.

The concept classifiers can be created in any conventional manner. Preferably, the concept classifiers are created via modeling techniques, such as the Naïve Bayes modeling technique and/or the Tree Augmented Naïve Bayes (TAN) modeling technique in the manner disclosed by Friedman et al., "Bayesian Network Classifiers," Machine Learning, No. 29, pp. 131-163 (1997), the disclosure of which is hereby incorporated herein by reference in its entirety. The Tree Augmented Naïve Bayes modeling technique, for example, can be used to find pairs of words 350 (shown in FIG. 4A) or other features that are closely related given the concept (or class) being examined (or learned). Concept classifiers created via the Naïve Bayes modeling technique likewise can apply these feature pairs and, as desired, regular word features and/or image features.

Review Facilitation

As noted above, many intellectual tasks involve reviewing documents. Auditors must review contracts to determine appropriate revenue recognition. Lawyers may wish to see how a document impacts the party they represent. Teachers may wish to review term papers with an eye to sections that have been plagiarized. Venture capitalists need to quickly and efficiently review dozens or hundreds of proposals.

In these cases, computer analysis of the documents may aid the reviewer. Portions of contracts that use standardized and well-understood paragraphs may bear less scrutiny than the portions with newly written paragraphs. Nevertheless, it is important to review the newly written paragraphs in the context of the entire document and not separately. Lawyers may analyze a document based on key phrases or sections. Teachers may want possibly plagiarized sections to be noted, in context. Venture capitalists may wish to cross-reference the current proposal with other proposals received previously based on commonality of topic.

Sometimes there is specific interest in reviewing the impact of changes between different versions of documents. Editors may wish to review an author's latest edits. Patent examiners may want to see how the new application compares to the previous one. Consumers may want to examine changes in terms and conditions in consumer disclosures. In these cases, there are one or more comparison documents in addition to a distinguished or so-called "original" document.

In each example case, the documents should be reviewed as they were presented and without any alterations, i.e., the document's visual integrity should be maintained.

Conventional methods for distinguishing portions of a document rely heavily on altering the visual integrity of the document. For example, search engines may render the search term where it appears in the document in a bold-faced font. It might be underlined. Both typographic alterations run several risks for the reviewer: (a) the reviewer can't determine if the term was originally bold or underlined (b) the document layout can change in order to make room for the wider bolded characters or for the extra interline spacing needed to accommodate underlining; (c) if the document layout is not altered, the wider bolded phrase and/or the underlining may encroach on other parts of the document nearby.

Another conventional technique for distinguishing portions of a document relies on inserting carets or other symbols into the document and running lines to marginal comments. This style of markup requires extra screen or paper area to accommodate the marginal comments and are ineffective on documents without adequate marginal white space.

Another conventional technique changes the color of a displayed or printed portion of a document. For example, the "track changes" feature in Microsoft Word displays edits in different colors to show their authors. This method does not work well for the 1 in 6 males who have functional color blindness, and, in Microsoft Word is combined with document-altering markup symbols, lines, and marginal notes.

Research has shown that none of these or other prior art techniques were best-in-class in optimizing the critical review of documents.

In many conventional document review applications, there is great important in reviewing the original document. When dealing with a displayed image of the original document, the image should have visual integrity with the original document. For example, an unaltered scan of the original document could be displayed with visual integrity. A print-image of an electronic document could be displayed with visual integrity.

The example embodiments provided herein are directed to a method that facilitates rapid and accurate document review by making such unobtrusive changes to the image that the reviewer knows what was on the original document and so that there are no distracting editing marks added to the document. This method allows review to proceed more quickly and more accurately. Most of these techniques for this method can be applied to both displayed and printed copies of a document. Some of the techniques require dynamic changes and are only applicable to displays of the document.

In example embodiments provided herein, the document processing method 200 advantageously enables a reviewer or other user to review images of the electronic documents 300. To avoid being misleading, an image of the selected electronic document 300 typically is displayed and/or printed in a manner that is faithful to the original incoming document 110 (shown in FIG. 1). For example, text content 320 that was not in bold text in the original incoming document 110 is preferably not presented in bold text.

As desired, the document processing method 200 can enable the image 300 of the selected electronic document 300 to be manipulated, as desired, to facilitate review of the associated incoming document 110. One or more portions of the image of the electronic document 300, for example, can be selected and/or hyperlinked regardless of whether the portions are displayed and/or printed in a manner that preserves the fidelity of the incoming document 110. The selected portions of the image of the electronic document 300 likewise can be displayed and/or printed, for example, by coloring or otherwise altering the text fonts according to the source of an associated text change. The document processing method 200 thereby can facilitate the review of the images of electronic documents 300 that might be obtained by receiving and imaging incoming documents 110 that can be provided as paper-based documents and/or that include signatures or other handwritten changes.

Figure 12B:
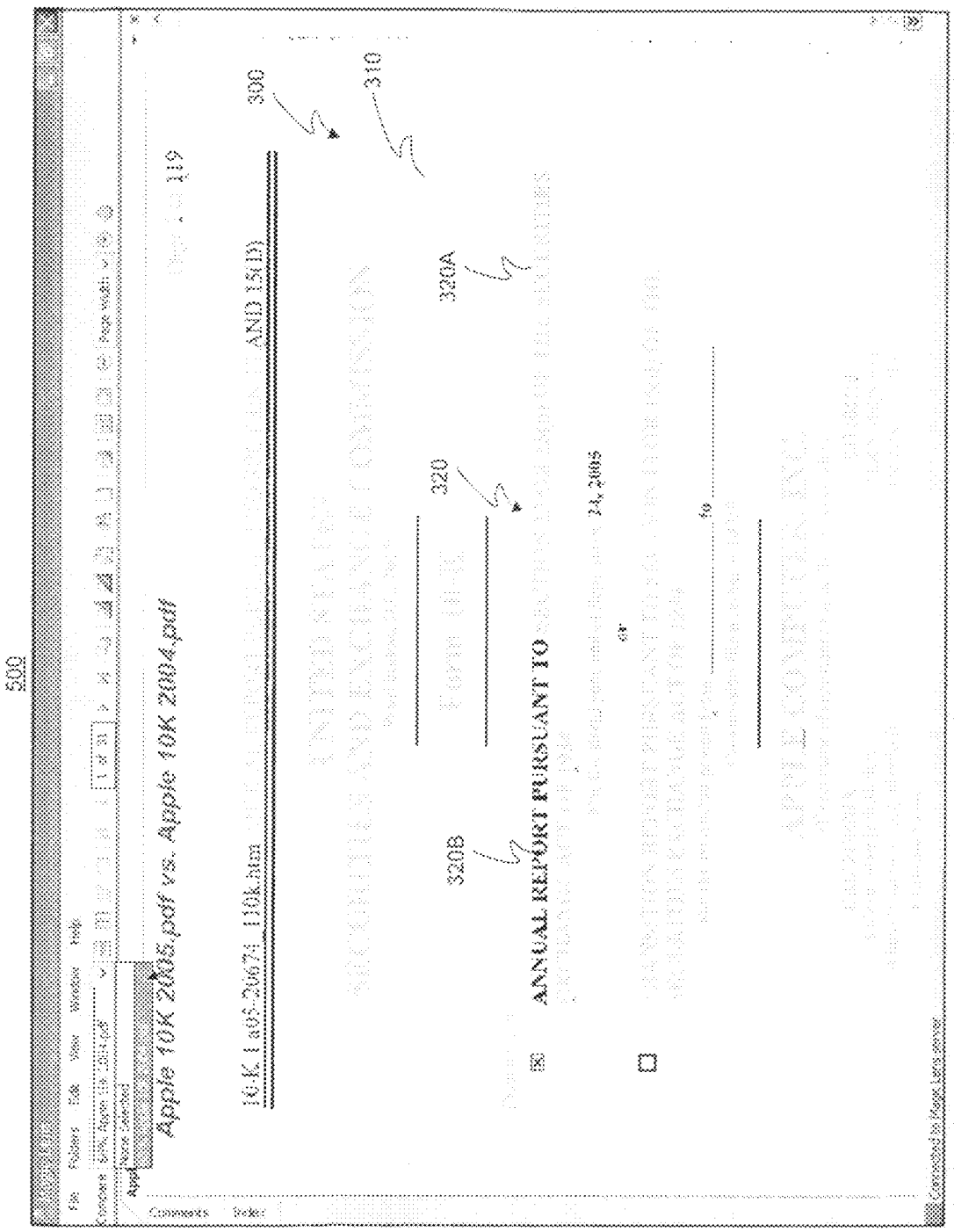
FIG. 12B is a detail drawing illustrating an alternative embodiment of the software tool of FIG. 12A, wherein the software tool permits an image of an electronic document to be altered to facilitate document review.
Figure 12C:
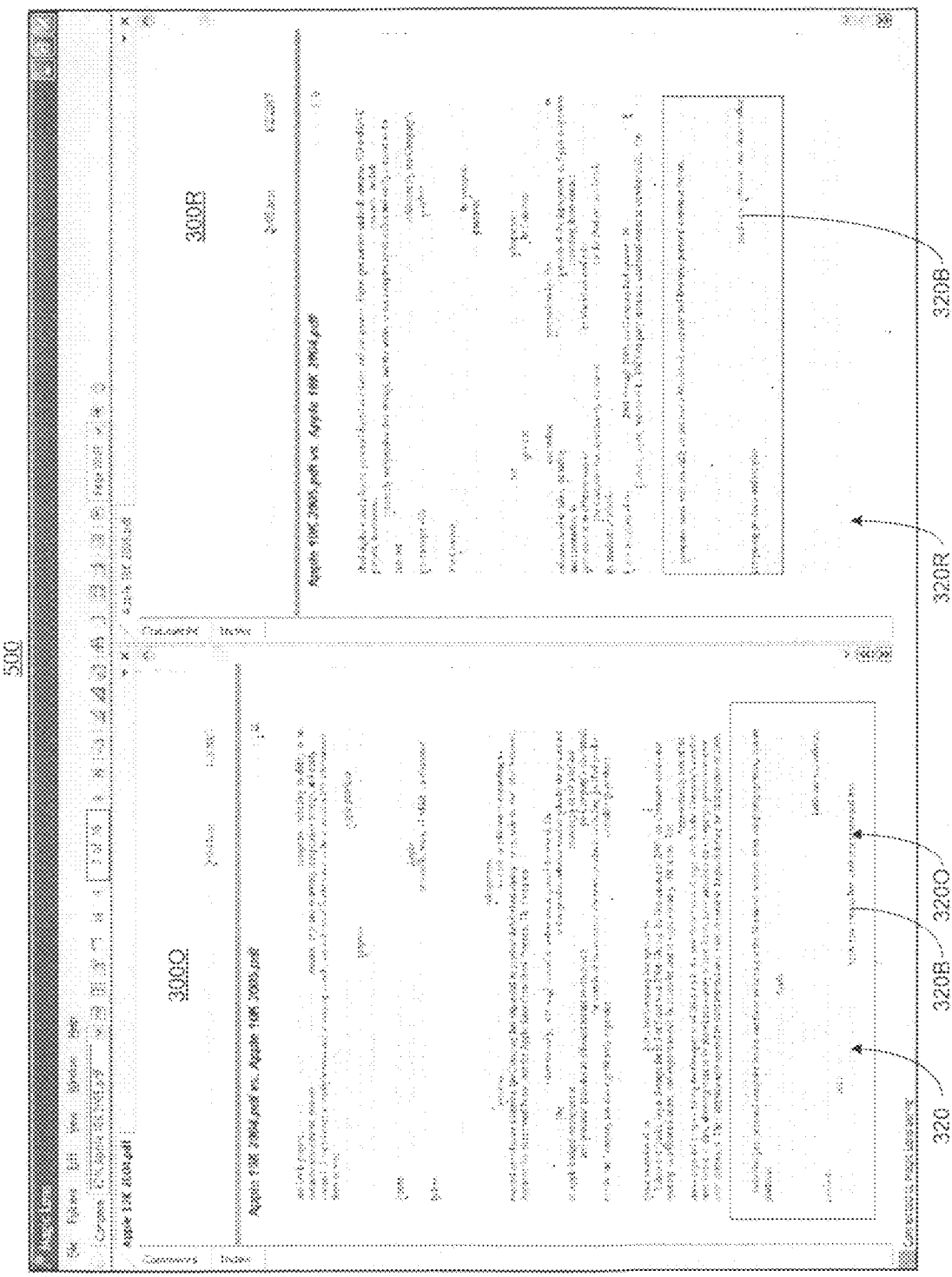
FIG. 12C is a detail drawing illustrating another alternative embodiment of the software tool of FIG. 12A, wherein the software tool permits side-by-side presentation of images of pairs of electronic documents.

The example embodiments provided herein illustrate different alternative techniques employable to carry out the subject method. Turning to FIGS. 12B-C, for example, the software tool 500 can permit an image of a selected electronic document 300 to be altered to facilitate document review. FIG. 12B shows an image of a selected page 310 of the electronic document 300, wherein a portion 320B of the textual content 320 has been emphasized by tinting (adding white to) complementary text. The portion 320B of the textual content 320 is associated with textual content 320 that has been changed; 329B is presented exactly as scanned but it appears to stand out because textual content 320 has been tinted. As illustrated in FIG. 12C, the software tool 500 likewise can provide a side-by-side presentation of images of pairs of electronic documents 300O, 300R in the manner set forth above. The images of electronic documents 300O, 300R respectively include textual content 320O, 320R. The portion 320B of the original textual content 320O of the original electronic document 300O that differs from the reference textual content 320R of the reference electronic document 300R is shown exactly as scanned, while unchanged text is shown in a lighter tint. Similarly, the portion 320B of the reference textual content 320R that differs from the original textual content 320O is presented exactly as scanned.

Figures 13A, 13B:
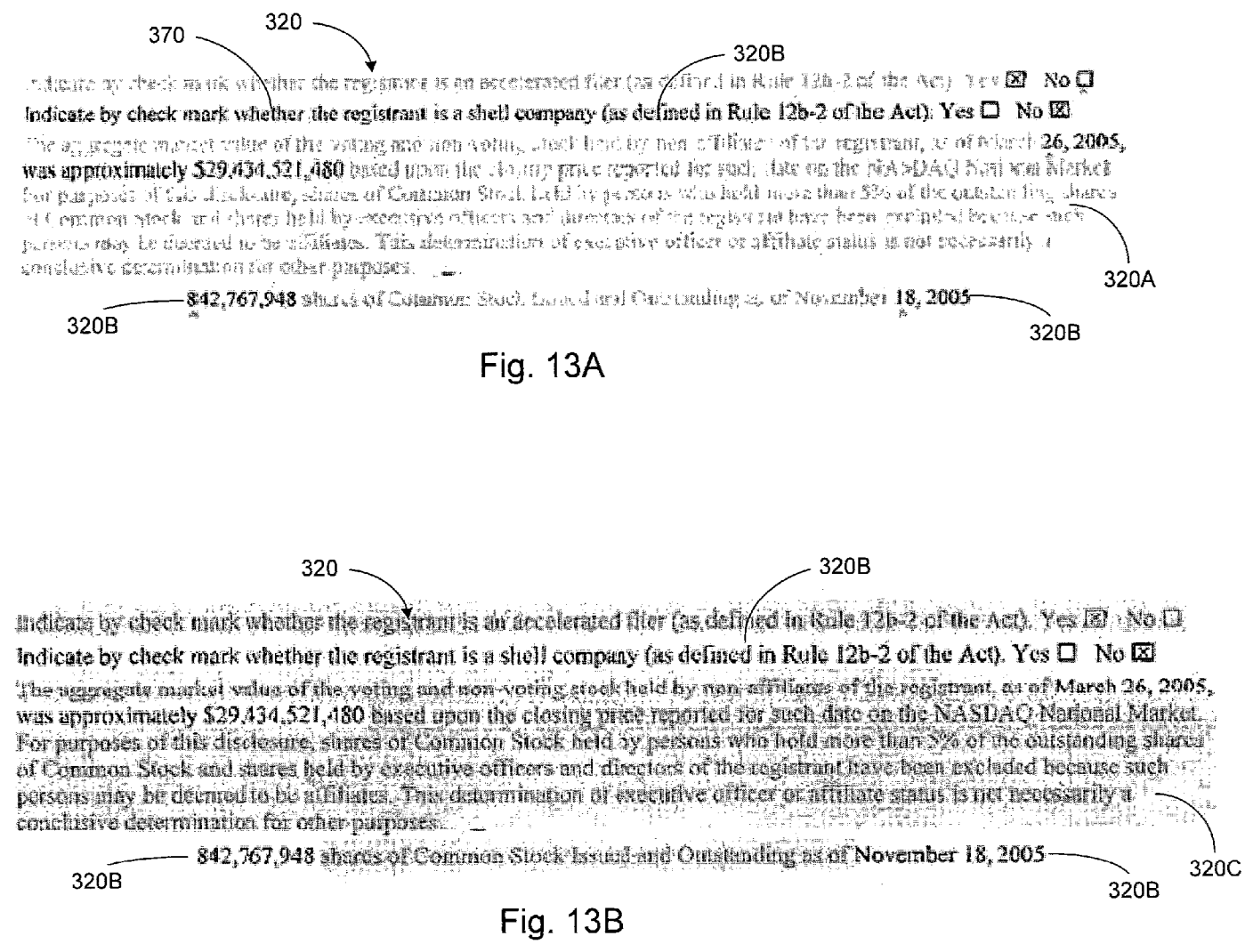

Other alternative techniques are illustrated in FIGS. 13A-13E. For example, as depicted in FIG. 13A, the contrast can be altered for a portion of the text 320 of the document. The entire original document can still be read, but changing the contrast allows certain portions 320A of the document to be de-emphasized which effectively emphasizes other portions 320B of the document. For example, in comparing two filings with the Securities and Exchange Commission, portions 320A of the document 300 which are identical to the previous year's filing are de-emphasized.

Note that in this example, the contrast has been reduced for information (portion 320A) that was present in the previous year's filing, but, that the document still has visual integrity and all of the text can be read. In the most recent filing, a sentence 370 has been added to note whether or not the registrant is a so-called shell company, and, the dates, numbers of shares outstanding, and aggregate market value have changed.

Alternatively, instead of reducing the contrast of certain portions 320A of the document, those portions 320A can be slightly blurred as if viewed through a slightly de-focused lens. Blurring serves a similar purpose to changing contrast to de-emphasize the text.

In another technique of this method, background color or texture is slightly altered. Turning to FIG. 13B, an example of background-texture 320C being altered is depicted. Altering texture is preferred for those who are color-blind, but color can be used if colors are chosen carefully to be seen as distinguishable shades of gray.

The previous techniques could be used on both displays and re-printed documents. The remaining techniques for the method of aiding review while preserving visual integrity of the original document use dynamic techniques that are only possible on display screens.

Where documents are compared one against others, it may be useful to see the comparison information. The example embodiment illustrated in FIG. 13C allows a user to place the cursor over the changed information (or, to touch it on a screen) illustrated as emphasized portion 320B so as to see the comparison information. The comparison information may also have visual integrity. However, in this first example depicted in FIG. 13C, the cursor is shown moved to a changed part 320B of the document and an overlay box (a "hover" box) 320D opens to show the current 320D1 and previous 320D2 information. In this example, the previous version of the SEC filing showed 402,057,856 shares instead of the current 842,767,948 shares. The difference is likely to be of interest to the reviewer.

A small caret or other symbol or mark 320E is preferably inserted into the document to indicate where it would be useful to place the cursor or finger. While this does, indeed, make a miniscule change to the visual integrity of the document, research has shown that it was much less intrusive than typical document markups and was particularly useful when the comparison document had no change. For example, in the embodiment depicted in FIG. 4, the comparison document included the phrase " . . . is able to present entire computing solutions". In the new document, the term "entire" has been omitted. The cursor is shown moved to the carrot 320E in the document and a "hover" box 320F opens to show the omitted term.

This can also be done, as depicted in FIG. 5, so as to show the comparison document with visual integrity instead of just the comparison information. The cursor is shown moved to the carrot 320E in the document and a "hover" box 320G opens to show the phrase with the omitted term.

If there is more than one comparison document, using mouse clicks, button presses, screen taps, or finger slides can be used to cycle through the comparison documents.

In another technique for preserving visual integrity is to move portions of the document closer to or further away from the viewer using a 3-D display. Since the reviewer knows that the original document was a flat 2-D document, the reviewer knows they are seeing a visually intact document where the only changes are in stereopsis.

In another technique, much like a paper "flip-book" allows a user to see the changes between pages as an animation, flipping between visually intact representations of the original document and comparison documents allows the eye to quickly spot what is changing as the documents are flipped back and forth. Use of mouse clicks, mouse scroll wheels, or finger gestures on screens (tapping or sliding) is a novel way to control the flipping between visually intact representations of documents.

All of the examples given above have dealt with displaying differences between documents. However, the display techniques could also be used to aid reviewers to see potentially problematic terms or phrases (such as the word "warrantee" in contracts), de-emphasizing sections which are identical to known libraries of boilerplate, or are "unexpected" by a computer analysis. At the same time, the techniques could also be used to de-emphasize expected differences (e.g. replacing one client's name with another), synonymous differences, or differences which were previously reviewed.

In all cases, the present method for visually aiding document review differs from prior art in that it maintains visually intact copies of the original document, employs changes that the reviewer knows were not present in the original to show emphasis or de-emphasis, and needs no additional space for markup.

Advantageously, the document processing method 200 (shown in FIG. 2) can be provided as an adaptive method for processing documents and can learn from several sources of information. For example, the document processing method 200 can learn from the electronic documents 300 (shown in FIG. 4A) themselves. By learning from the electronic documents 300, the document processing method 200 can increase the accuracy of the imaging process and/or the accuracy of the segmentation process. As set forth above, segmentation information often can be embedded in the formatting information of the electronic document 300. The document processing method 200 likewise can learn from information, such as feedback, provided by one or more reviewers or other users. A user can provide page-type labels for use by the page type classifier, concept labels for selected document segments, and/or segmenting information for improving the segment classifier that operates at the word level. The user information can be provided to the document processing method 200 at any suitable time, such as during review and/or independently during knowledge transfer sessions between a subject matter expert and the research team.

Figure 14A:
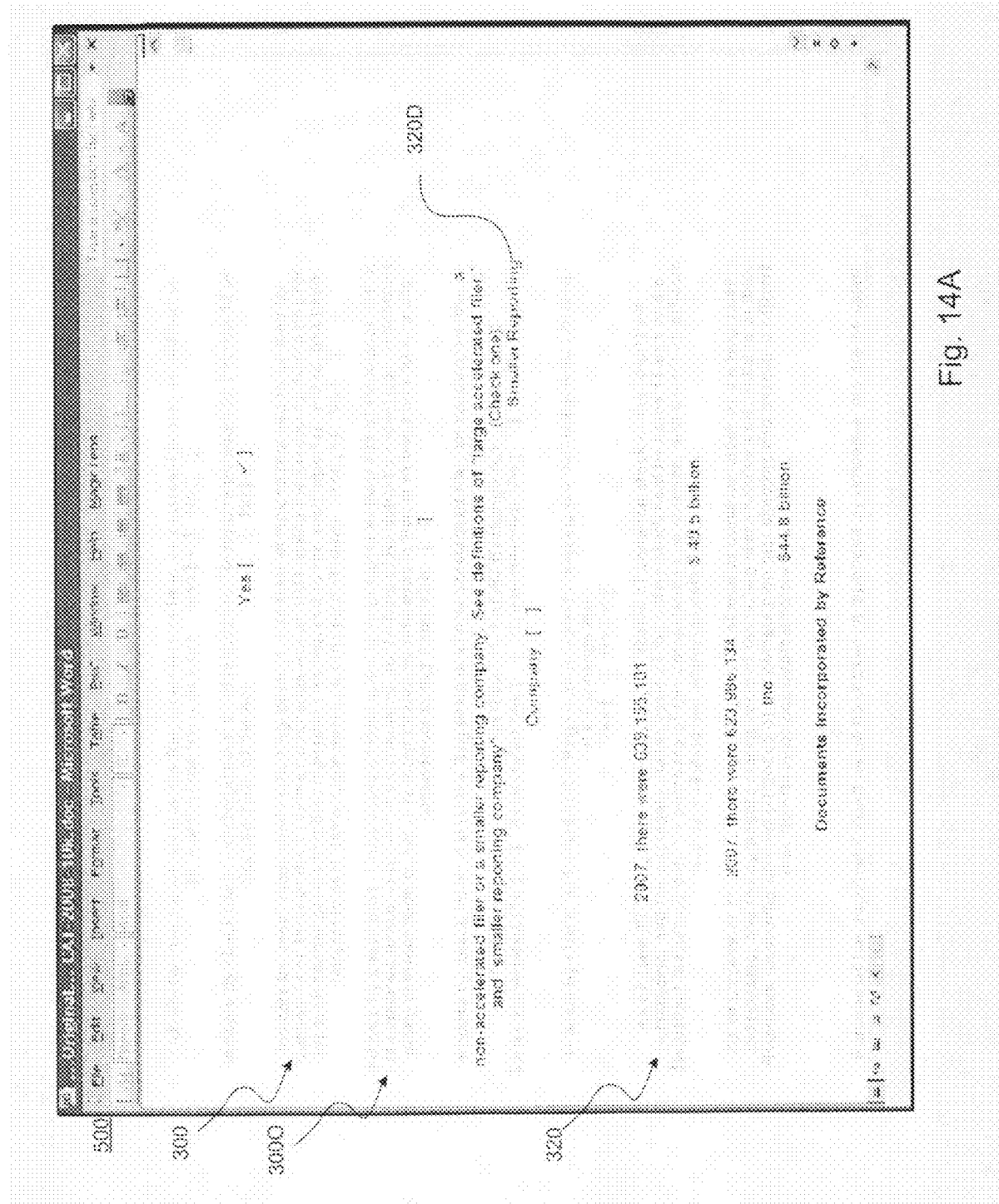
FIG. 14A is a detail drawing illustrating another alternative embodiment of the software tool of FIG. 12A, wherein the software tool is implemented in conjunction with a word processing software program.
Figure 14B:
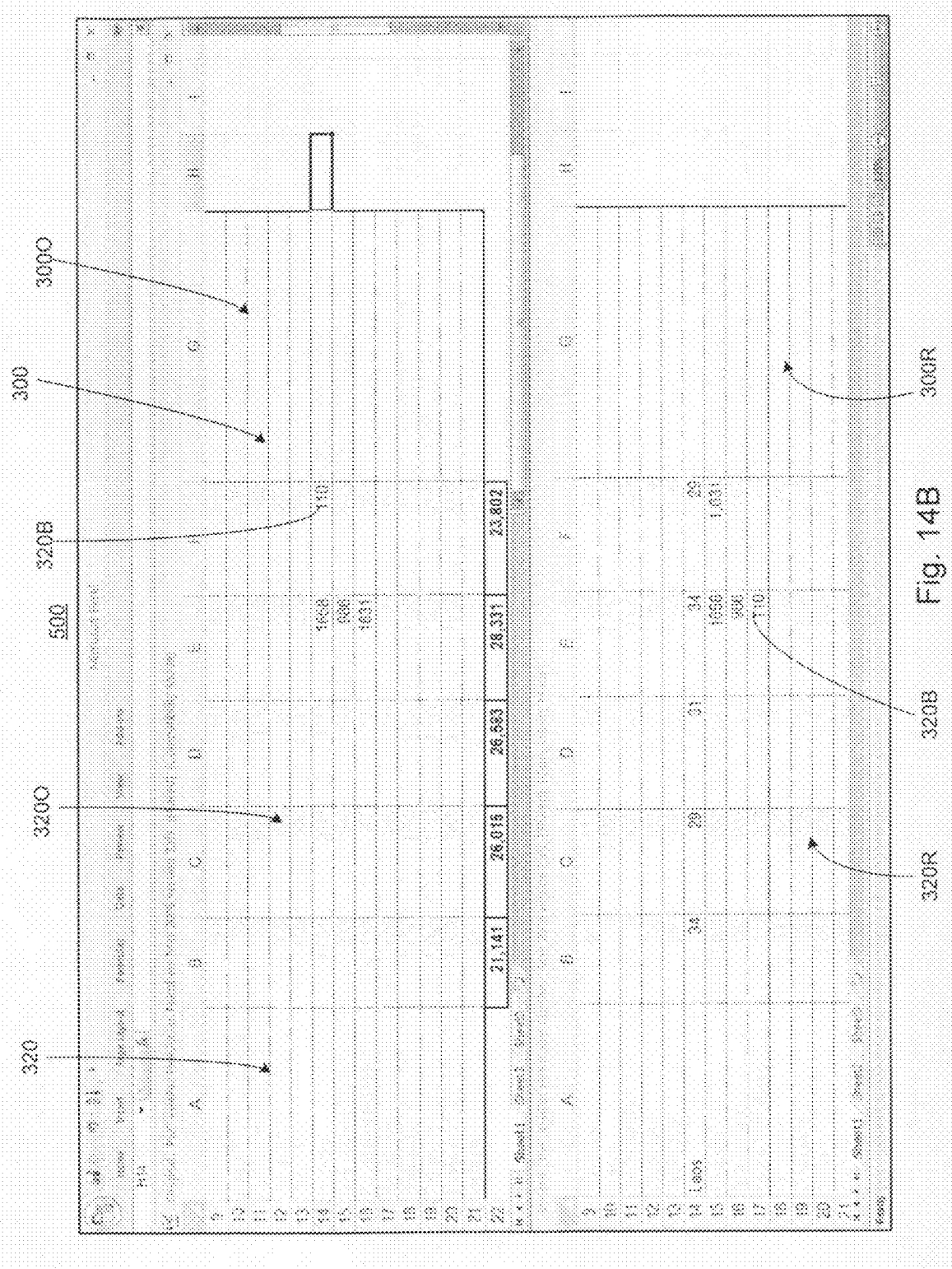
FIG. 14B is a detail drawing illustrating an alternative embodiment of the software tool of FIG. 13A, wherein the software tool is implemented in conjunction with a spreadsheet software program.

The software tool 500 can be implemented in conjunction with any conventional software application. For example, the software tool 500 can be implemented with a word processing software program, such as Microsoft® Word®, as shown in FIG. 14A. FIG. 14B likewise illustrates the software tool 500 as being implemented in conjunction with a spreadsheet software program, such as Microsoft® Excel®.

The disclosure is susceptible to various modifications and alternative forms, and specific examples thereof have been shown by way of example in the drawings and are herein described in detail. It should be understood, however, that the disclosure is not to be limited to the particular forms or methods disclosed, but to the contrary, the disclosure is to cover all modifications, equivalents, and alternatives.

What is claimed is:

1. A processor-implemented method for comparing and viewing documents, comprising the steps of:
    classifying each page of a first document into a category;
    segmenting each page of the first document into logical word sequences;
    creating a hierarchical table of contents for the first document;
    comparing the text of the first document to the text of a second document to determine segments that are changed versus segments that are unchanged; and displaying summary views of the first or second documents on a display device with words shown in differing contrast to indicate matching text versus novel text.

2. The processor-implemented method of claim 1, further comprising enabling reviewer searching for highly matching text between the first and second documents.

3. The processor-implemented method of claim 1, further comprising navigating to highly matching text between the first and second documents.

4. The processor-implemented method of claim 1, further comprising comparing recognitions of phrases, sentences, and paragraphs of the first document with previously encountered or standard phrases, sentences, and paragraphs.

5. The processor-implemented method of claim 1, wherein the first document is an electronic document.

6. The processor-implemented method of claim 1, wherein the first document is an imaged document.

7. The processor-implemented method of claim 1, wherein the first document is an optical character recognition (OCR)-processed document.

8. The processor-implemented method of claim 1, where the step of classifying each page is performed with a multi-class classifier.

9. The processor-implemented method of claim 1, where the step of classifying each page is performed with a set of binary classifiers that vote to determine with which class a page should be labeled.

10. The processor-implemented method of claim 1, where the step of comparing the text of the first document the second document includes detecting places where the documents contain exactly the same content.

11. The processor-implemented method of claim 1, where the step of segmenting each page is performed with a binary classifier.

12. The processor-implemented method of claim 11, where the step of segmenting each page includes using text and image features to determine that a new segment in a document has started.

13. The processor-implemented method of claim 12, wherein the text features include the density or occurrence of a word or a word class on a page.

14. The processor-implemented method of claim 12, where the step of segmenting each page includes using page class labels.

15. The processor-implemented method claim 1, where the step of segmenting each page is performed in phases using different classifiers for each level of the document hierarchy.

16. The processor-implemented method of claim 15, further comprising the step of extracting the document hierarchy from the first document.

17. The processor-implemented method of claim 1, where the step of creating a hierarchical table of contents includes generating components of the hierarchical table of contents where the first document lacks physical or traditional components of a table of contents.

18. The processor-implemented method of claim 17, where the step of generating said components of the hierarchical table of contents comprises using a binary classifier to generate said components of the hierarchical table.

19. The processor-implemented method of claim 17, where the step of generating said components of the hierarchical table of contents comprises using a multi-class classifier to generate said components of the hierarchical table.

20. The processor-implemented method of claim 1, where the step of comparing the first and second documents includes detecting places where the documents contain exactly or substantially the same text content.

21. The processor-implemented method of claim 20, where the step of comparing the first and second documents includes determining word-level distance between segments of the first and second documents.

22. The processor-implemented method of claim 21, where the step of determining word-level distance includes comparing the words in every segment of the first document to every segment of the second document.

23. The processor-implemented method of claim 22, where the step of determining word-level distance further comprises determining whether two segments have a minimal amount of common text.

24. The processor-implemented method of claim 23, further comprising the step of determining whether two segments have N occurrences of at least K consecutive identical words, where N and K are integers.

25. The processor-implemented method of claim 24, further comprising the step of calculating an edit distance between segments by determining the insertion, deletion, or replacement cost for each word that is inserted, deleted or replaced from one segment to another.

26. The processor-implemented method of claim 25, further comprising the step of calculating the edit distance between segments by dividing the edit distance of the segment by the number of words in the segment.

27. The processor-implemented method of claim 26, where the step of calculating the edit distance between segments includes calculating distances in multiple dimensions including row segments and column segments in a table.

28. The processor-implemented method of claim 25, further comprising the step of aligning each segment in the first document with a most similar segment in the second document.

29. The processor-implemented method of claim 28, further comprising the step of determining the longest common subsequence between pairs of segments in the first and second documents.

30. The processor-implemented method of claim 29, further comprising the step of determining the segment level edit distance between the first and second documents.

31. The processor-implemented method of claim 1, further comprising the step of locating moved text between the first and second documents.

32. The processor-implemented method of claim 1, further comprising the step of locating the most similar text in the second document to a selected area of text in the first document.

33. The processor-implemented method of claim 1, further comprising the step of locating deleted text between the first and second documents.

34. The processor-implemented method of claim 1, further comprising the step of locating inserted text between the first and second documents.

35. The processor-implemented method of claim 1, further comprising the step of detecting places where the documents contain conceptually the same content for a reasonably large span of content.

36. The processor-implemented method of claim 20, wherein symbols are considered words.

37. The processor-implemented method of claim 36, further comprising the step of comparing matching symbols for equality.

38. The processor-implemented method of claim 4 further comprising improving optical character recognition when comparing documents against known phrases, sentences, paragraphs, sections or documents by considering alternative recognitions.

39. The processor-implemented method of claim 1 further comprising the merging of segments which optimally increase the similarity between documents segments.

40. The processor-implemented method of claim 4, further comprises comparing recognitions of phrases, sentences, and paragraphs of the first document with new documents and user feedback.

41. The processor-implemented method of claim 1, where the step of displaying the first document includes using a view of the first document that is substantially similar to the original form of the first document.

42. The processor-implemented method of claim 1, further comprising the step of enabling user text searching for text belonging to a predetermined category using one or more classifiers.

43. The processor-implemented method of claim 42, further comprising the step of utilizing user-labeled examples to enhance the classifiers.

44. The processor-implemented method of claim 12, further comprising the step of utilizing user-labeled examples to enhance the classifiers.

45. The processor-implemented method of claim 15, further comprising the step of utilizing user-labeled examples to enhance the classifiers.

46. The processor-implemented method of claim 1, where the step of comparing considers common classes of words as equivalent for text comparison purposes.

47. The processor-implemented method of claim 1, where the step of comparing utilizes classifiers to find similar text and display it to the user as matching text.

48. The processor-implemented method of claim 1, where the step of displaying utilizes different colors or textures to indicate matching text.

49. The processor-implemented method of claim 1, further comprising the step of enabling navigation by double-clicking on an area of text in the first document, to navigate to and highlight the matching text in the second document.

50. The processor-implemented method of claim 1, further comprising the step of enabling navigation by selecting an area of text in the first document and then navigating to and highlighting the matching text in the second document.

51. The processor-implemented method of claim 1, further comprising the step of enabling navigation by creating hyperlinks between documents and document segments.

52. The processor-implemented method of claim 1, further comprising the step of ordering documents in terms of their similarities to each other.

53. The processor-implemented method of claim 1, further comprising the step of enabling the comparison of documents originating in different file formats.

* * * * *